United States Patent
Tamiya et al.

(10) Patent No.: US 12,375,264 B2
(45) Date of Patent: Jul. 29, 2025

(54) INFORMATION CONCEALING CONTROL APPARATUS, INFORMATION CONCEALING APPARATUS, INFORMATION RECONFIGURATION CONTROL APPARATUS, INFORMATION RECONFIGURING APPARATUS, INFORMATION CONCEALING SYSTEM, INFORMATION CONCEALING CONTROL METHOD, INFORMATION RECONFIGURATION CONTROL METHOD, INFORMATION CONCEALING CONTROL PROGRAM, AND INFORMATION RECONFIGURATION CONTROL PROGRAM

(71) Applicant: NEC Corporation, Tokyo (JP)

(72) Inventors: Hiroto Tamiya, Tokyo (JP); Toshiyuki Isshiki, Tokyo (JP)

(73) Assignee: NEC CORPORATION, Tokyo (JP)

(*) Notice: Subject to any disclaimer, the term of this patent is extended or adjusted under 35 U.S.C. 154(b) by 170 days.

(21) Appl. No.: 18/034,849

(22) PCT Filed: Nov. 17, 2020

(86) PCT No.: PCT/JP2020/042853
§ 371 (c)(1),
(2) Date: May 1, 2023

(87) PCT Pub. No.: WO2022/107224
PCT Pub. Date: May 27, 2022

(65) Prior Publication Data
US 2023/0412362 A1  Dec. 21, 2023

(51) Int. Cl.
*H04L 9/06* (2006.01)
*H04L 9/08* (2006.01)
*H04L 9/32* (2006.01)

(52) U.S. Cl.
CPC .......... *H04L 9/0656* (2013.01); *H04L 9/0825* (2013.01); *H04L 9/0869* (2013.01); *H04L 9/3231* (2013.01)

(58) Field of Classification Search
CPC . H04L 2209/34; H04L 9/0656; H04L 9/0825; H04L 9/0866; H04L 9/0869; H04L 9/3231
See application file for complete search history.

(56) References Cited

U.S. PATENT DOCUMENTS 5,680,460 A * 10/1997 Tomko .................. G06V 40/12
                                              713/186
6,363,485 B1 * 3/2002 Adams ................. H04L 9/3231
                                              713/186
(Continued)

FOREIGN PATENT DOCUMENTS

JP       2002-538504 A       11/2002
JP       2010-108365 A        5/2010
(Continued)

OTHER PUBLICATIONS

International Search Report for PCT Application No. PCT/JP2020/042853, mailed on Feb. 16, 2021.
(Continued)

*Primary Examiner* — Sharon S Lynch

(57) ABSTRACT

An information concealing system includes: an information concealing apparatus configured to generate a pseudo-random number, convert first information into first conversion information by using the pseudo-random number, and cause a concealment information generating unit to generate first concealment information capable to reconfigure the first information, based on the first conversion information; and an information reconfiguring apparatus configured to extract information related to a seed from the first concealment information, generate a reconfiguration-side pseudo-random (Continued)

number, based on the information related to the seed, convert input second information into second conversion information by using the reconfiguration-side pseudo-random number, and reconfigure the first information concealed as the first concealment information, based on the second conversion information and the first concealment information.

5 Claims, 19 Drawing Sheets

(56) References Cited

U.S. PATENT DOCUMENTS

| | | | | |
|---|---|---|---|---|
| 9,496,897 | B1* | 11/2016 | Triandopoulos | H04L 63/0435 |
| 10,115,323 | B2* | 10/2018 | Yasuda | H04L 9/3231 |
| 10,257,173 | B2* | 4/2019 | Nicholls | H04L 9/0825 |
| 10,348,724 | B2* | 7/2019 | Brands | H04W 12/04 |
| 10,680,808 | B2* | 6/2020 | Takahashi | G06F 21/32 |
| 10,805,093 | B2* | 10/2020 | Van Der Sluis | H04L 9/0869 |
| 10,904,006 | B2* | 1/2021 | Ohori | H04L 9/0869 |
| 10,958,645 | B2* | 3/2021 | Brands | H04L 63/0861 |
| 10,985,914 | B2* | 4/2021 | Noguchi | H04L 9/0866 |
| 11,032,255 | B2* | 6/2021 | Nicholls | H04L 9/3236 |
| 11,146,410 | B2* | 10/2021 | Merchan | H04L 9/3278 |
| 2002/0029341 | A1 | 3/2002 | Juels et al. | |
| 2010/0281336 | A1* | 11/2010 | Seurin | H04L 9/0838 714/755 |
| 2011/0185176 | A1 | 7/2011 | Takahashi et al. | |
| 2015/0195088 | A1* | 7/2015 | Rostami | H04L 9/3278 380/28 |
| 2015/0287416 | A1* | 10/2015 | Brands | H04L 9/3231 704/273 |
| 2016/0119143 | A1 | 4/2016 | Fang et al. | |
| 2017/0034160 | A1* | 2/2017 | Brands | H04M 3/56 |
| 2017/0041132 | A1* | 2/2017 | Nicholls | H04L 9/0825 |
| 2017/0076639 | A1* | 3/2017 | Yasuda | G09C 1/00 |
| 2017/0185761 | A1* | 6/2017 | Stanwood | G06V 40/1365 |
| 2017/0310489 | A1* | 10/2017 | Van Der Sluis | H04L 9/3278 |
| 2017/0324563 | A1* | 11/2017 | Isshiki | G09C 1/00 |
| 2018/0174493 | A1* | 6/2018 | Ohori | H04L 9/0656 |
| 2018/0241558 | A1* | 8/2018 | Takahashi | H04L 9/3231 |
| 2018/0262331 | A1* | 9/2018 | Noguchi | H04L 9/0866 |
| 2019/0097794 | A1* | 3/2019 | Nix | H04W 52/0235 |
| 2019/0213462 | A1* | 7/2019 | McDonald | G06K 19/06168 |
| 2019/0306164 | A1* | 10/2019 | Brands | H04W 12/06 |
| 2019/0327029 | A1 | 10/2019 | Mittal et al. | |
| 2019/0327092 | A1* | 10/2019 | Kareti | H04L 9/0825 |
| 2020/0084191 | A1* | 3/2020 | Nicholls | H04L 9/3236 |
| 2020/0106600 | A1* | 4/2020 | Dreifus | H04L 9/3066 |
| 2022/0358203 | A1* | 11/2022 | Qureshi | H04L 9/3278 |

FOREIGN PATENT DOCUMENTS

| | | |
|---|---|---|
| JP | 2011-253378 A | 12/2011 |
| JP | 2016-533694 A | 10/2016 |

OTHER PUBLICATIONS

Yevgeniy Dodis et al., "Fuzzy Extractors: How to Generate Strong Keys from Biometrics and Other Noisy Data", Advances in Cryptology—EUROCRYPT 2004, 2004, pp. 523-540, <DOI:10.1007/978-3-540-24676-3_31>.

JP Office Action for JP Application No. 2022-563289, mailed on Feb. 6, 2024 with English Translation.

* cited by examiner

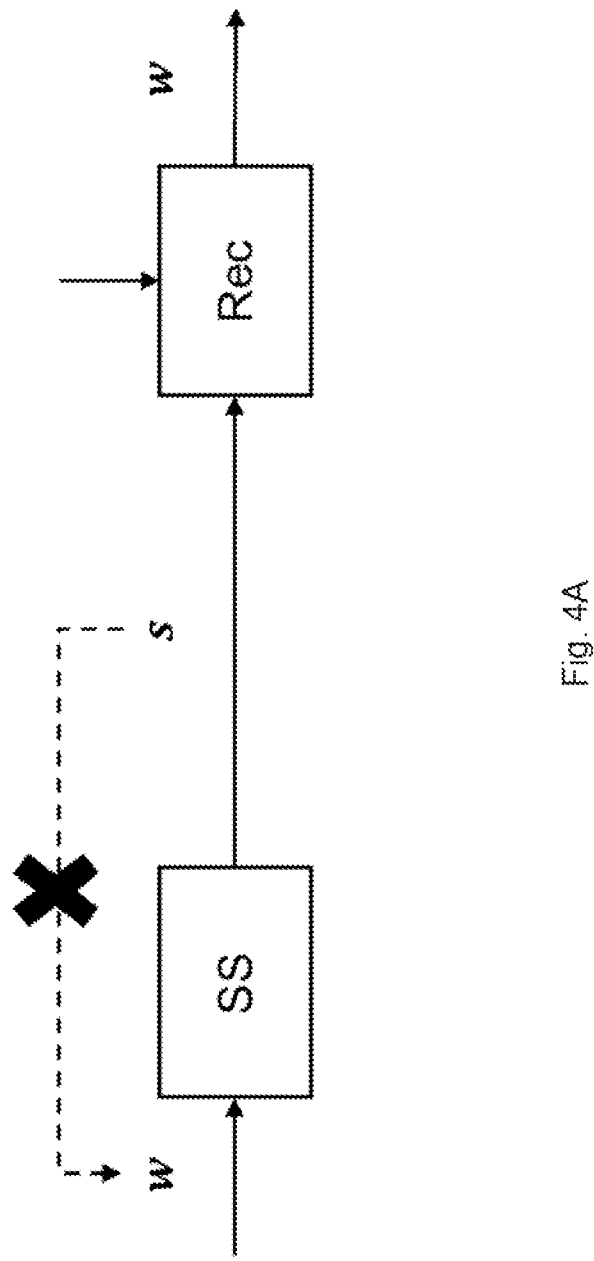

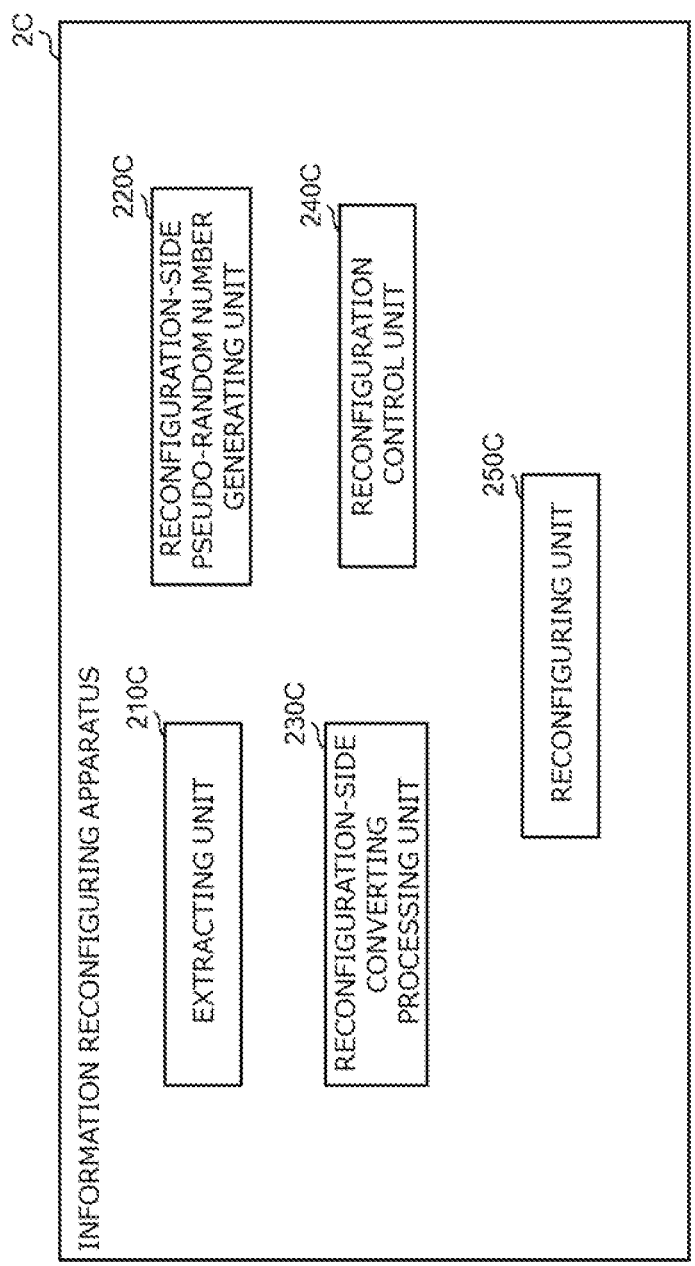

INFORMATION CONCEALING CONTROL APPARATUS, INFORMATION CONCEALING APPARATUS, INFORMATION RECONFIGURATION CONTROL APPARATUS, INFORMATION RECONFIGURING APPARATUS, INFORMATION CONCEALING SYSTEM, INFORMATION CONCEALING CONTROL METHOD, INFORMATION RECONFIGURATION CONTROL METHOD, INFORMATION CONCEALING CONTROL PROGRAM, AND INFORMATION RECONFIGURATION CONTROL PROGRAM

This application is a National Stage Entry of PCT/JP2020/042853 filed on Nov. 17, 2020, the contents of all of which are incorporated herein by reference, in their entirety.

TECHNICAL FIELD

The present invention relates to an information concealing control apparatus, an information concealing apparatus, an information reconfiguration control apparatus, an information reconfiguring apparatus, an information concealing system, an information concealing control method, an information reconfiguration control method, an information concealing control program, and an information reconfiguration control program.

BACKGROUND ART

Electronic signature technology has hitherto been widely used with the aim of prevention of fraudulent acts such as falsification and manipulation on electronic documents, and personal authentication. In the electronic signature technology, a pair of a private key being information having high confidentiality and a public key being information that has little impact on security even if the key is disclosed, is generated and stored in advance. An electronic signature is generated for an electronic document using the private key, and whether or not the electronic document corresponding to the electronic signature has falsification, manipulation, or the like is inspected using the public key. Note that common examples of a method of storing the private key in the electronic signature technology include a method of storing the private key in an information storage medium such as an IC card. However, when the IC card is lost, stolen, or the like, security may be disadvantageously deteriorated due to leakage of the private key.

As a countermeasure to such a problem, in recent years, biometric authentication technology has been widely used, in which personal authentication is performed using biometric information, such as fingerprints, veins, and face images (for example, see PTL 1). The biometric authentication technology has advantages in fewer risks of being lost or stolen, as compared to the authentication technology using an IC card or the like. In the biometric authentication technology, features are extracted from biometric information of a user and are stored as registration information, and features of biometric information of the user input at the time of personal authentication and the registration information are compared to determine whether or not the user can be authenticated.

CITATION LIST

Patent Literature

[PTL 1] JP 2016-533694 T

SUMMARY

Technical Problem

Biometric information cannot be replaced. Thus, once biometric information of a user being registered is leaked, fraudulent acts such as spoofing as the user with the use of the leaked biometric information can occur, which may lead to violation of privacy and security of the user. On the other hand, even if a private key as replaceable information is managed with an IC card or the like, there is still a problem in that security may be deteriorated when the IC card or the like is lost, stolen, or the like. In view of this, reducing information leakage risks has been desired.

An example object of the present invention is to provide an information concealing control apparatus, an information concealing apparatus, an information reconfiguration control apparatus, an information reconfiguring apparatus, an information concealing system, an information concealing control method, an information reconfiguration control method, an information concealing control program, and an information reconfiguration control program to reduce information leakage risks.

Solution to Problem

An information concealing control apparatus according to the present invention includes: a concealment-side pseudo-random number generating unit configured to generate a pseudo-random number from a seed; a concealment-side converting processing unit configured to perform converting processing of converting first information being input into first conversion information by using the pseudo-random number; and a concealment information generating control unit configured to cause a concealment information generating unit generating concealment information based on input information to generate first concealment information capable to reconfigure the first information, based on the first conversion information.

An information concealing apparatus according to the present invention includes: a concealment-side pseudo-random number generating unit configured to generate a pseudo-random number from a seed; a concealment-side converting processing unit configured to perform converting processing of converting first information being input into first conversion information by using the pseudo-random number; a concealment information generating unit configured to generate concealment information, based on input information; and a concealment information generating control unit configured to cause the concealment information generating unit to generate first concealment information capable to reconfigure the first information, based on the first conversion information.

An information reconfiguration control apparatus according to the present invention includes: an extracting unit configured to extract information related to a seed from first concealment information generated by a concealment information generating unit generating concealment information based on input information, the first concealment information being capable to reconfigure first information; a reconfiguration-side pseudo-random number generating unit configured to generate a reconfiguration-side pseudo-random number, based on the information related to the seed being extracted; a reconfiguration-side converting processing unit configured to convert input second information into second conversion information by using the reconfiguration-side pseudo-random number; and a reconfiguration control unit configured to cause a reconfiguring unit configured to reconfigure information concealed as the concealment information to reconfigure the first information concealed as the first concealment information, based on the second conversion information and the first concealment information.

An information reconfiguring apparatus according to the present invention includes: an extracting unit configured to extract information related to a seed from first concealment information generated by a concealment information generating unit generating concealment information based on input information, the first concealment information being capable to reconfigure first information; a reconfiguration-side pseudo-random number generating unit configured to generate a reconfiguration-side pseudo-random number, based on the information related to the seed being extracted; a reconfiguration-side converting processing unit configured to convert input second information into second conversion information by using the reconfiguration-side pseudo-random number; a reconfiguring unit configured to reconfigure information concealed as the concealment information; and a reconfiguration control unit configured to cause the reconfiguring unit to reconfigure the first information concealed as the first concealment information, based on the second conversion information and the first concealment information.

An information concealing system according to the present invention includes: an information concealing apparatus; and an information reconfiguring apparatus, the information concealing apparatus including: a concealment-side pseudo-random number generating unit configured to generate a pseudo-random number from a seed; a concealment-side converting processing unit configured to perform converting processing of converting first information being input into first conversion information by using the pseudo-random number; a concealment information generating unit configured to generate concealment information, based on input information; and a concealment information generating control unit configured to cause the concealment information generating unit to generate first concealment information capable to reconfigure the first information, based on the first conversion information, the information reconfiguring apparatus including: an extracting unit configured to extract information related to the seed from the first concealment information generated by the concealment information generating unit configured to generate the concealment information based on input the information, the first concealment information being capable to reconfigure the first information; a reconfiguration-side pseudo-random number generating unit configured to generate a reconfiguration-side pseudo-random number, based on the information related to the seed being extracted; a reconfiguration-side converting processing unit configured to convert input second information into second conversion information by using the reconfiguration-side pseudo-random number; a reconfiguring unit configured to reconfigure information concealed as the concealment information; and a reconfiguration control unit configured to cause the reconfiguring unit to reconfigure the first information concealed as the first concealment information, based on the second conversion information and the first concealment information.

An information concealing control method according to the present invention includes: generating a pseudo-random number from a seed; performing converting processing of converting first information being input into first conversion information by using the pseudo-random number; and causing a concealment information generating unit generating concealment information based on input information to generate first concealment information capable to reconfigure the first information, based on the first conversion information.

An information reconfiguration control method according to the present invention includes: extracting information related to a seed from first concealment information generated by a concealment information generating unit generating concealment information based on input information, the first concealment information being capable to reconfigure first information; generating a reconfiguration-side pseudo-random number by using the seed being extracted; converting input second information into second conversion information by using the reconfiguration-side pseudo-random number; and causing a reconfiguring unit configured to reconfigure information concealed as the concealment information to reconfigure the first information concealed as the first concealment information, based on the second conversion information and the first concealment information.

An information concealing control program according to the present invention causes a computer to execute: generating a pseudo-random number from a seed; performing converting processing of converting first information being input into first conversion information by using the pseudo-random number; and causing a concealment information generating unit generating concealment information based on input information to generate first concealment information capable to reconfigure the first information, based on the first conversion information.

An information reconfiguration control program according to the present invention causes a computer to execute: extracting information related to a seed from first concealment information generated by a concealment information generating unit generating concealment information based on input information, the first concealment information being capable to reconfigure first information; generating a reconfiguration-side pseudo-random number by using the seed being extracted; converting input second information into second conversion information by using the reconfiguration-side pseudo-random number; and causing a reconfiguring unit configured to reconfigure information concealed as the concealment information to reconfigure the first information concealed as the first concealment information, based on the second conversion information and the first concealment information.

According to the present invention, the information concealing control apparatus, the information concealing apparatus, the information reconfiguration control apparatus, the information reconfiguring apparatus, the information concealing system, the information concealing control method, the information reconfiguration control method, the information concealing control program, and the information reconfiguration control program to reduce information leakage risks can be provided. Note that, according to the present invention, instead of or together with the above effects, other effects may be exerted.

BRIEF DESCRIPTION OF THE DRAWINGS

FIG. 4A illustrates a secure sketch algorithm and a reconfiguration algorithm according to the first example embodiment;

FIG. 16 is a functional block diagram illustrating a functional configuration of an information reconfiguring apparatus according to the third example embodiment.

DESCRIPTION OF THE EXAMPLE EMBODIMENTS

Figure 1:
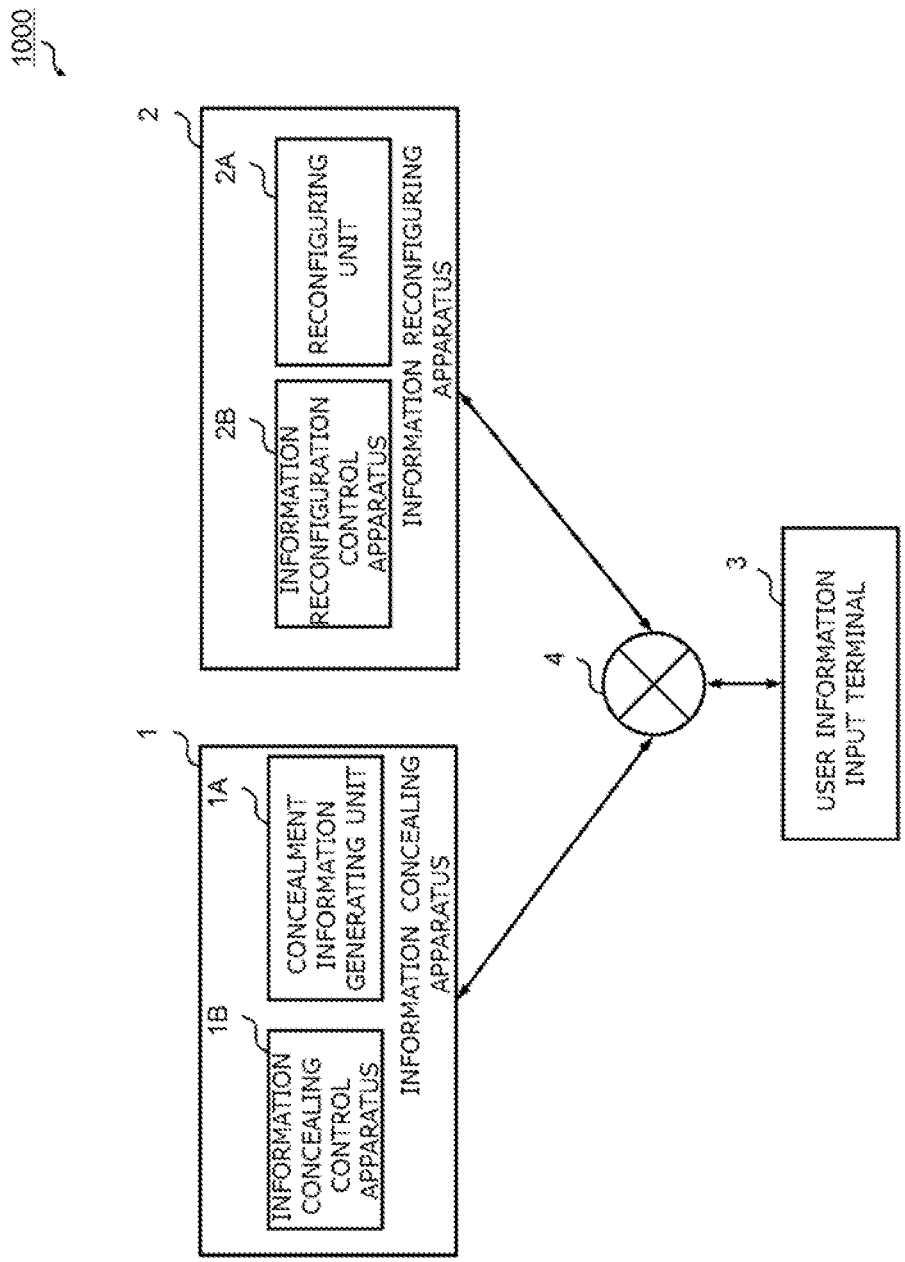
FIG. 1 is a diagram illustrating an example of an operation mode of an information concealing system according to a first example embodiment.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Each example embodiment described below is merely an example of a configuration that can implement the present invention. Each example embodiment described below can be appropriately modified or changed according to a configuration of an apparatus to which the present invention is applied and various conditions. All of combinations of elements included in each example embodiment described below are not necessarily required to implement the present invention, and a part of the elements can be appropriately omitted. Hence, the scope of the present invention is not limited by the configuration described in each example embodiment described below. Configurations in which a plurality of configurations described in the example embodiments are combined can also be adopted unless the configurations are consistent with each other.

Descriptions will be given in the following order.
1. Overview of Example Embodiments of Present Invention
2. First Example Embodiment
  2.1. Overview of Operation Mode of Information Concealing System
  2.2. Hardware Configuration of Information Processing Apparatus
  2.3. Overview of Secure Sketch
  2.4. Problem in Secure Sketch
  2.5. Functional Configuration of Information Concealing Control Apparatus
  2.6. Functional Configuration of Information Reconfiguration Control Apparatus
  2.7. Overview of Secure Sketch Using Error Correction Code
  2.8. Overview of Secure Sketch and Reconfiguration Using PIN
3. Second Example Embodiment
4. Third Example Embodiment
5. Other Example Embodiments

1. Overview of Example Embodiments of Present Invention

First, an overview of example embodiments of the present invention will be described.

(1) Technical Issue

Electronic signature technology has hitherto been widely used with the aim of prevention of fraudulent acts such as falsification and manipulation on electronic documents, and personal authentication. In the electronic signature technology, a pair of a private key being information having high confidentiality and a public key being information that has little impact on security even if the key is disclosed, is generated and stored in advance. An electronic signature is generated for an electronic document using the private key, and whether or not the electronic document corresponding to the electronic signature has falsification, manipulation, or the like is inspected using the public key. Note that common examples of a method of storing the private key in the electronic signature technology include a method of storing the private key in an information storage medium such as an IC card. However, when the IC card is lost, stolen, or the like, security may be disadvantageously deteriorated due to leakage of the private key.

As a countermeasure to such a problem, in recent years, biometric authentication technology has been widely used, in which personal authentication is performed using biometric information, such as fingerprints, veins, and face images. The biometric authentication technology has advantages in fewer risks of being lost or stolen, as compared to the authentication technology using an IC card or the like. In the biometric authentication technology, features are extracted from biometric information of a user and are stored as registration information, and features of biometric information of the user input at the time of personal authentication and the registration information are compared to determine whether or not the user can be authenticated.

Biometric information cannot be replaced. Thus, once biometric information of a user being registered is leaked, fraudulent acts such as spoofing as the user with the use of the leaked biometric information can occur, which may lead to violation of privacy and security of the user. On the other hand, even if a private key as replaceable information is managed with an IC card or the like, there is still a problem in that security may be deteriorated when the IC card or the like is lost, stolen, or the like. In view of this, reducing information leakage risks has been desired.

In view of the circumstances described above, the present example embodiment has an example object to provide an information concealing control apparatus, an information concealing apparatus, an information reconfiguration control apparatus, an information reconfiguring apparatus, an information concealing system, an information concealing control method, an information reconfiguration control method, an information concealing control program, and an information reconfiguration control program to reduce information leakage risks.

(2) Technical Features

The example embodiments of the present invention include: a concealment-side pseudo-random number generating unit configured to generate a pseudo-random number from a seed; a concealment-side converting processing unit configured to perform converting processing of converting first information being input into first conversion information by using the pseudo-random number; and a concealment information generating control unit configured to cause a concealment information generating unit generating concealment information based on input information to generate first concealment information capable to reconfigure the first information, based on the first conversion information.

With this configuration, the information concealing control apparatus, the information concealing apparatus, the information reconfiguration control apparatus, the information reconfiguring apparatus, the information concealing system, the information concealing control method, the information reconfiguration control method, the information concealing control program, and the information reconfiguration control program to reduce information leakage risks can be provided. Note that the technical features described above are merely a specific example of the example embodiments of the present invention, and as a matter of course, the example embodiments of the present invention are not limited to the technical features described above.

2. First Example Embodiment

With reference to FIG. 1 to FIG. 11, a first example embodiment of the present invention will be described below. The present example embodiment will describe an information concealing system that conceals biometric information of a user, such as fingerprints, veins, and face images. In the following description, for description of a letter provided with a hat, "(hat)" is added following the letter, and for description of a letter provided with a tilde, "(tilde)" is added following the letter.

2.1. Overview of Operation Mode of Information Concealing System

FIG. 1 is a diagram illustrating an example of an operation mode of an information concealing system 1000 according to the first example embodiment of the present invention. As illustrated in FIG. 1, in the information concealing system 1000, an information concealing apparatus 1, an information reconfiguring apparatus 2, and a user information input terminal 3 are connected to one another via a network 4.

The information concealing apparatus 1 is an information processing apparatus, such as a server, which is installed with a program that performs a secure sketch based on biometric information of a user to thereby generate concealment information in which the biometric information of the user is concealed. The information concealing apparatus 1 includes a concealment information generating unit 1A that performs secure sketch on the biometric information of the user to generate the concealment information in which the biometric information of the user is concealed, and an information concealing control apparatus 1B that controls execution of the secure sketch by the concealment information generating unit 1A. An overview of the secure sketch in the information concealing apparatus 1 will be described below.

The information reconfiguring apparatus 2 is an information processing apparatus, such as a server, which is installed with a program that reconfigures the biometric information of the user concealed in the concealment information. The information concealing apparatus 1 includes a reconfiguring unit 2A that reconfigures the biometric information of the user, and an information reconfiguration control apparatus 2B that controls execution of the reconfiguration by the reconfiguring unit 2A. An overview of the reconfiguration of the concealment information in the information reconfiguring apparatus 2 will be described below.

The user information input terminal 3 is an information processing apparatus operated by the user to perform reading of fingerprints and veins, capturing of face images, and the like, and is implemented with a portable information processing terminal such as a smartphone, a personal computer (PC), an automatic teller machine (ATM), and the like. The user information input terminal 3 includes, as an input unit 17 (see FIG. 2), a sensor for acquiring the biometric information of the user, such as fingerprints, veins, and face images.

Note that, although FIG. 1 illustrates an example in which the user information input terminal 3 is connected to the information concealing apparatus 1 and the information reconfiguring apparatus 2 via the network 4, the user information input terminal 3 need not necessarily be connected to the network 4. For example, the user information input terminal 3 may be connected to the information concealing apparatus 1 and the information reconfiguring apparatus 2 via a Universal Serial Bus (USB) or the like. The user information input terminal 3 may be connected to the information concealing apparatus 1 and the information reconfiguring apparatus 2 when the user information input terminal 3 transmits the biometric information of the user to the information concealing apparatus 1 and when the user information input terminal 3 transmits the biometric information of the user to the information reconfiguring apparatus 2, respectively.

2.2. Hardware Configuration of Information Processing Apparatus

Figure 2:
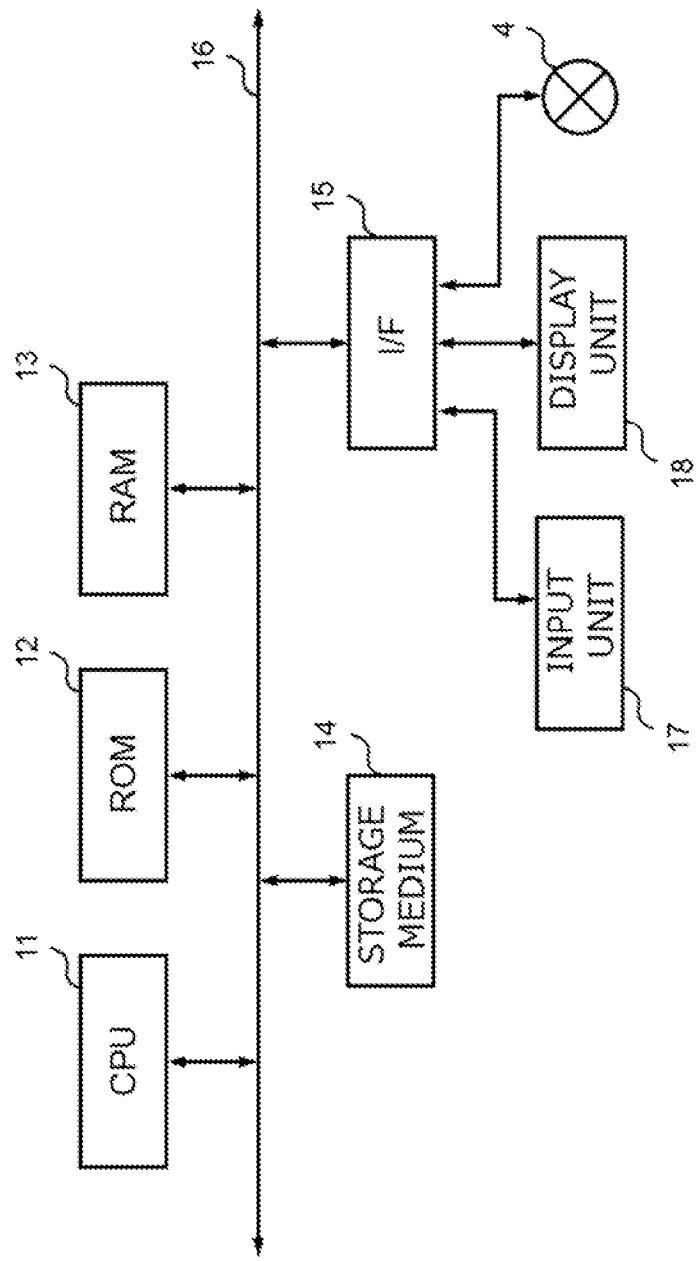
FIG. 2 is a block diagram illustrating a hardware configuration of an information processing apparatus according to the first example embodiment.

Next, with reference to FIG. 2, a hardware configuration of an information processing apparatus according to the present example embodiment, such as the information concealing apparatus 1, the information concealing control apparatus 1B, the information reconfiguring apparatus 2, the information reconfiguration control apparatus 2B, or the user information input terminal 3, will be described. FIG. 2 is a block diagram illustrating a hardware configuration of the information processing apparatus.

In the information processing apparatus, a central processing unit (CPU) 11, a read only memory (ROM) 12, a random access memory (RAM) 13, a storage medium 14, and an interface (I/F) 15 are connected to each other via a bus 16. An input unit 17, a display unit 18, and the network 4 are connected to the I/F 15.

The CPU 11 is a computation means, and controls overall operations of the information processing apparatus. The RAM 13 is a volatile storage medium capable of rapid reading and writing of information, and is used as a working area when the CPU 11 processes information. The ROM 12 is a read-only non-volatile storage medium, and stores programs such as firmware. The storage medium 14 is a non-volatile storage medium, such as a hard disk drive (HDD), capable of reading and writing of information, and stores an operating system (OS), various control programs, application programs, and the like.

The I/F 15 connects the bus 16 and various pieces of hardware, the network, and the like, and performs control. The input unit 17 is an input apparatus, such as a keyboard and a mouse, for the user to input information to the information processing apparatus. The display unit 18 is a display apparatus, such as a liquid crystal display (LCD), for the user to check a state of the information processing apparatus. Note that the input unit 17 and the display unit 18 may be omitted in the information concealing apparatus 1 and the information reconfiguring apparatus 2.

As described above, the user information input terminal 3 includes, as the input unit 17 (see FIG. 2), a sensor for acquiring the biometric information of the user, such as fingerprints, veins, and face images.

In such a hardware configuration as described above, with the CPU 11 performing computation in accordance with the program stored in the ROM 12 and the program loaded from the storage medium 14 into the RAM 13, a software control unit of the information processing apparatus is configured. A combination of the software control unit configured as described above and the hardware configures functional blocks for implementing the functions of a controller 100 (see FIG. 6) of the information concealing control apparatus 1B, the concealment information generating unit 1A, a controller 200 (see FIG. 7) of the information reconfiguration control apparatus 2B, the reconfiguring unit 2A, and the user information input terminal 3 according to the present example embodiment.

2.3. Overview of Secure Sketch

Figure 3:
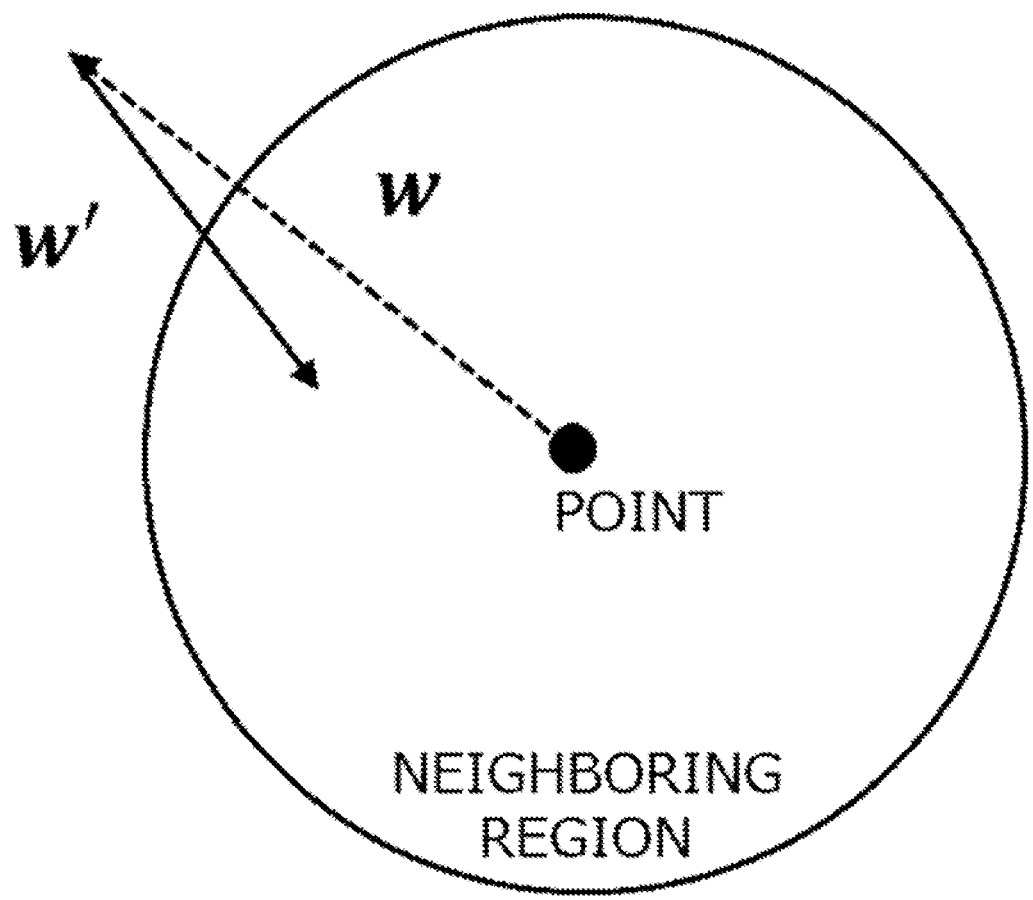
FIG. 3 is a model diagram for illustrating a secure sketch according to the first example embodiment.
Figure 4B:
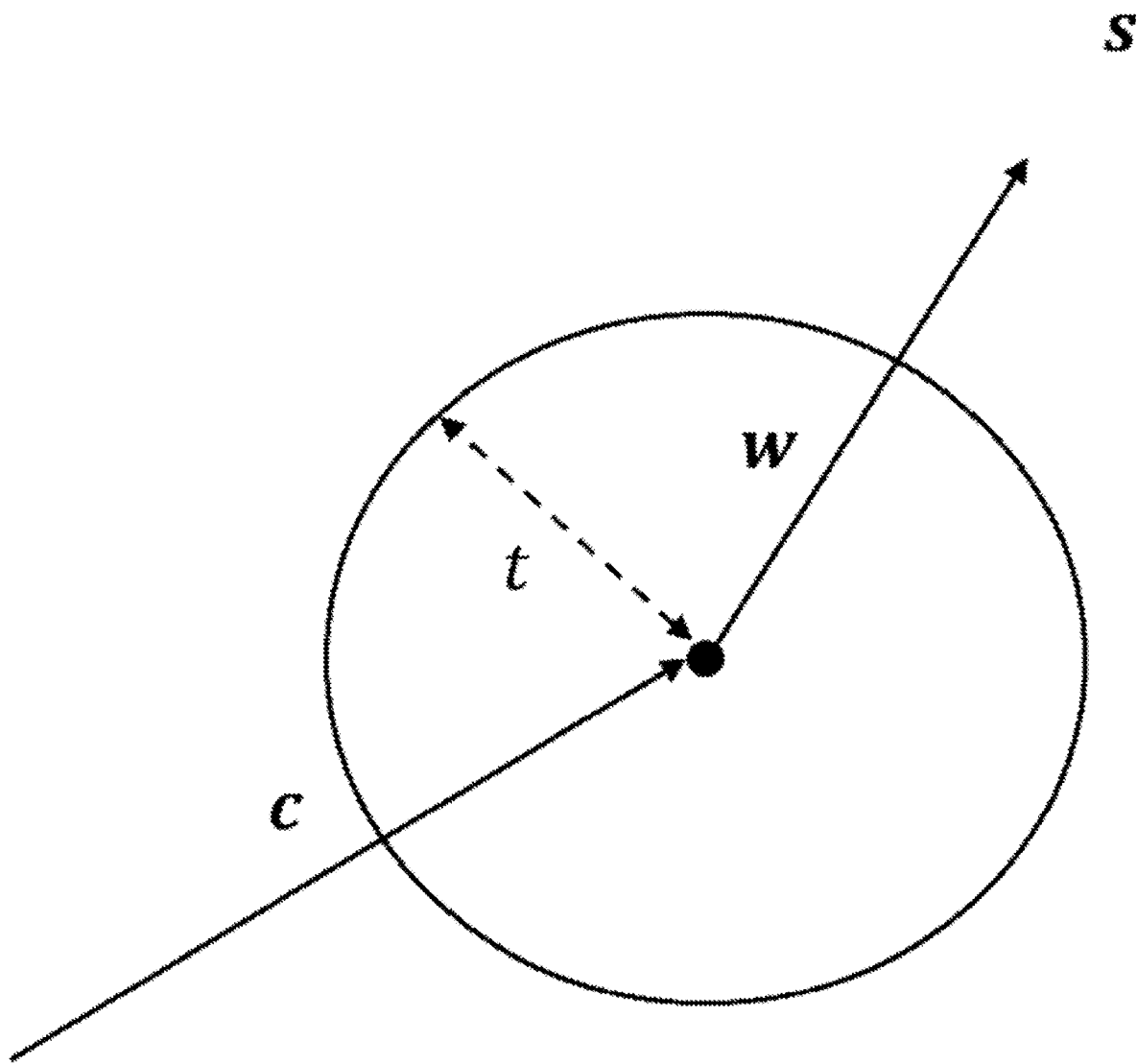
FIG. 4B is a model diagram of the secure sketch algorithm according to the first example embodiment.
Figure 4C:
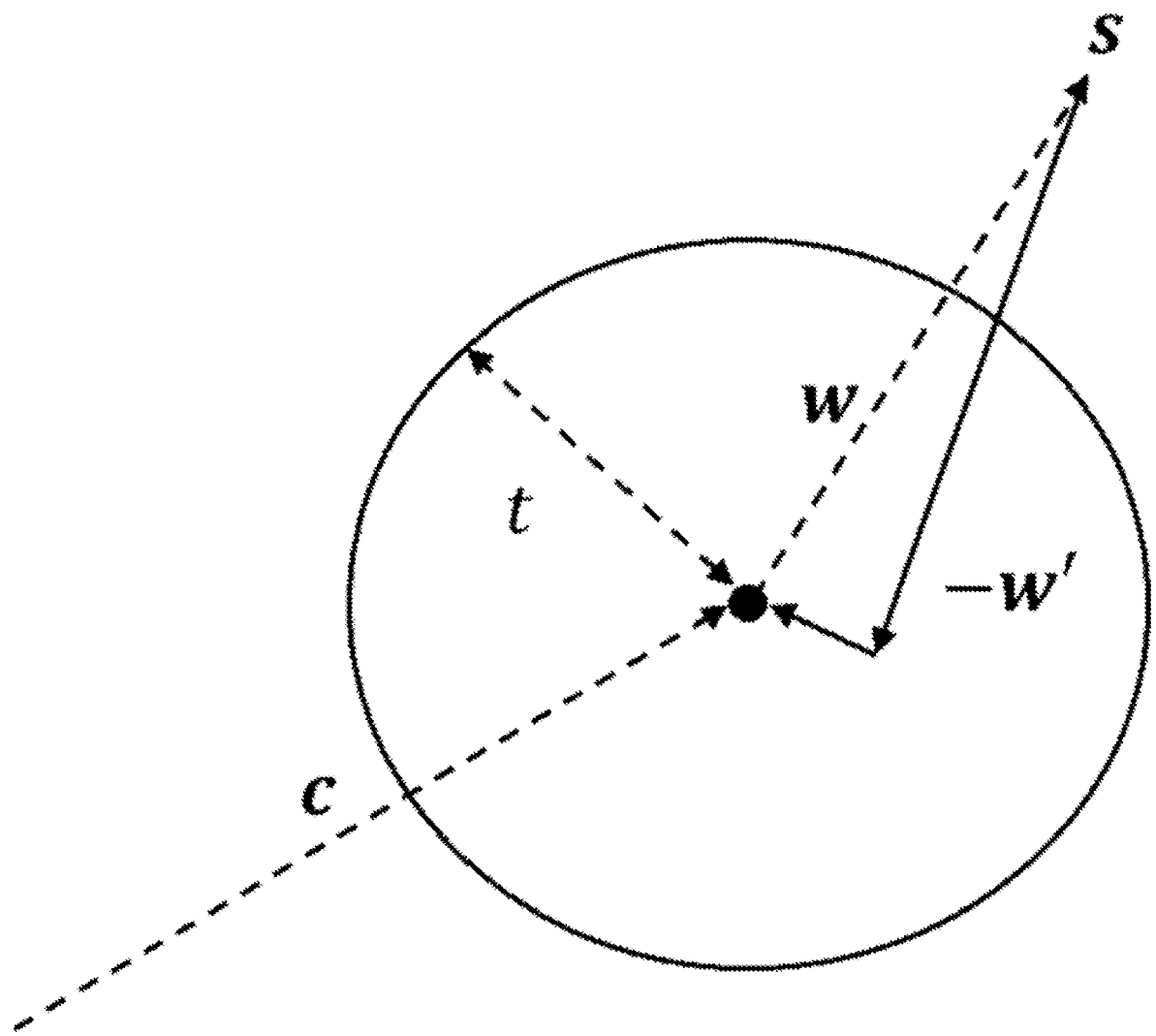
FIG. 4C is a model diagram of the reconfiguration algorithm according to the first example embodiment.

Next, with reference to FIG. 3, FIG. 4A, FIG. 4B, and FIG. 4C, a secure sketch being a method of concealing information having high confidentiality and the like will be described. FIG. 3 is a model diagram for illustrating a secure sketch. FIG. 4A is an explanatory diagram of a secure sketch algorithm (SS) and a reconfiguration algorithm (Rec). FIG. 4B is a model diagram of the secure sketch algorithm (SS). FIG. 4C is a model diagram of the reconfiguration algorithm (Rec).

In the biometric authentication technology, the biometric information of the user, such as fingerprints, veins, and face images, is registered in advance, and whether or not the user can be authenticated is determined based on results of comparison with the biometric information of the user input at the time of personal authentication. However, once the biometric information of the user being registered is leaked, fraudulent acts such as spoofing as the user with the use of the leaked biometric information can occur, which may lead to violation of privacy and security of the user.

As a countermeasure to such a problem, a method referred to as "secure sketch" is used, in which a private key is generated from information having high confidentiality. In the secure sketch, as illustrated in FIG. 3, for example, it is assumed that data "close" to registered data $$w \qquad \text{[Math. 1]}$$

is input as an example of data being a vector, the input data being expressed as follows.

$$w' \qquad \text{[Math. 2]}$$

The data w being a vector may be hereinafter simply referred to as "data w", and the data w' being a vector may be hereinafter simply referred to as "data w'". The secure sketch is a method in which a difference between the data w and the data w' is regarded as a noise in such a case, and the data w is output. FIG. 3 illustrates modeled input and output of the data w and the data w' in the secure sketch on an assumption that the data w and the data w' are each a vector.

In FIG. 3, the data w' "close" to the data w is defined as such data that the difference w-w' between the data w and the data w' is within a predetermined region (neighboring region F) around a point p. In the illustration of FIG. 3, the neighboring region F is a circle, but the neighboring region F is not limited to a circle.

As illustrated in FIG. 4A, the secure sketch is a method consisting of two algorithms, i.e., the secure sketch algorithm (SS) for outputting a sketch s and the reconfiguration algorithm (Rec) for outputting the data w based on the sketch s and the data w'. First, a procedure in which the data w is input and the sketch s is output in the secure sketch algorithm (SS) will be described. In the secure sketch algorithm (SS), first, a random number $$r \qquad \text{[Math. 3]}$$

is generated, the generated random number r is coded using a coding function Enc to generate a codeword $$c \qquad \text{[Math. 4]}$$

(Expression 1-1). The random number r being a vector may be hereinafter simply referred to as a "random number r", and the codeword c being a vector may be hereinafter simply referred to as a "codeword c". The coding function Enc is a function for converting input data (here, the random number r) into the codeword c.

$$c:=\text{Enc}(r) \ldots \text{(Expression 1-1)} \qquad \text{[Math. 5]}$$

In (Expression 1-1), the random number r is generated such that the codeword c can error-correct the data w. Specifically, the random number r is generated such that t-bit error correction can be successfully performed with the codeword c. Next, in the secure sketch algorithm (SS), a value obtained by reversibly computing the codeword c and the data w is output as the sketch s (Expression 1-2). As indicated by the broken line in FIG. 4A, from the point of view of security, it is required that, regarding the sketch s, the data w cannot be inferred from the sketch s.

$$s:=c+w \ldots \text{(Expression 1-2)} \qquad \text{[Math. 6]}$$

FIG. 4B illustrates the sketch s output after the data w is added to the codeword c. The sketch s being a vector may be hereinafter simply referred to as a "sketch s". As illustrated in FIG. 4B, the sketch s is out of the range in which error correction can be successfully performed with the codeword c, and thus even if error correction is performed on the sketch s, concealed data w cannot be inferred.

Next, a procedure in which the data w is output based on the sketch s and the data w' in the reconfiguration algorithm (Rec) will be described. Here, for the sake of description, it is assumed that such data w' that the difference w-w' between the data w and the data w' is within the neighboring region F is input to the reconfiguration algorithm (Rec). Here, being "within the neighboring region F" corresponds to being within the range of t bits in which error correction can be successfully performed with the codeword c.

In the reconfiguration algorithm (Rec), the sketch s is decoded using a decoding function Dec based on the data w', and a codeword c (tilde) is output (Expression 1-3). The decoding function Dec is a function for outputting the codeword c (tilde) closest to input data (here, the data w').

$$\tilde{c} := Dec(s-w') \quad \ldots \text{(Expression 1-4)} \quad \text{[Math. 7]}$$

Data w (tilde) output from the reconfiguration algorithm (Rec) is defined by the sketch s and the codeword c (tilde) closest to the input data w', as in (Expression 1-4).

$$\tilde{w} := s - \tilde{c} \quad \ldots \text{(Expression 1-4)} \quad \text{[Math. 8]}$$

Here, from (Expression 1-2), (Expression 1-3) can be expressed as follows.

$$Dec(s-w') = Dec(c+w-w') \quad \ldots \text{(Expression 1-5)} \quad \text{[Math. 9]}$$

The data w' is within the neighboring region F with respect to the data w, and thus the difference w-w' can be error-corrected with the codeword c. In this case, it can be derived that error correction is performed on (Expression 1-5) regarding the difference w-w', and the codeword c (tilde) closest to the input data w' is the codeword c (Expression 1-6).

$$\tilde{c} = c \quad \ldots \text{(Expression 1-6)} \quad \text{[Math. 10]}$$

Then, from (Expression 1-6) and (Expression 1-4), the data w is reconfigured (Expression 1-7).

$$\tilde{w} = s - c = w \quad \ldots \text{(Expression 1-7)} \quad \text{[Math. 11]}$$

FIG. 4C illustrates the sketch s when the difference w-w' between the data w and the data w' is within the neighboring region F. As illustrated in FIG. 4B, the sketch s is out of the range in which error correction can be successfully performed with the codeword c, and thus even if error correction is performed on the sketch s, concealed data w cannot be obtained. However, by decoding the codeword c (tilde) closest to the input data w', the data w can be inferred using the reconfiguration algorithm (Rec), on the condition that the difference w-w' between the data w and the data w' is within the neighboring region F.

In this manner, in the secure sketch, by reversibly computing the codeword c for the data w to be concealed, the sketch s in the range in which error correction cannot be successfully performed with the codeword c is generated.

2.4. Problem in Secure Sketch

Figure 5:
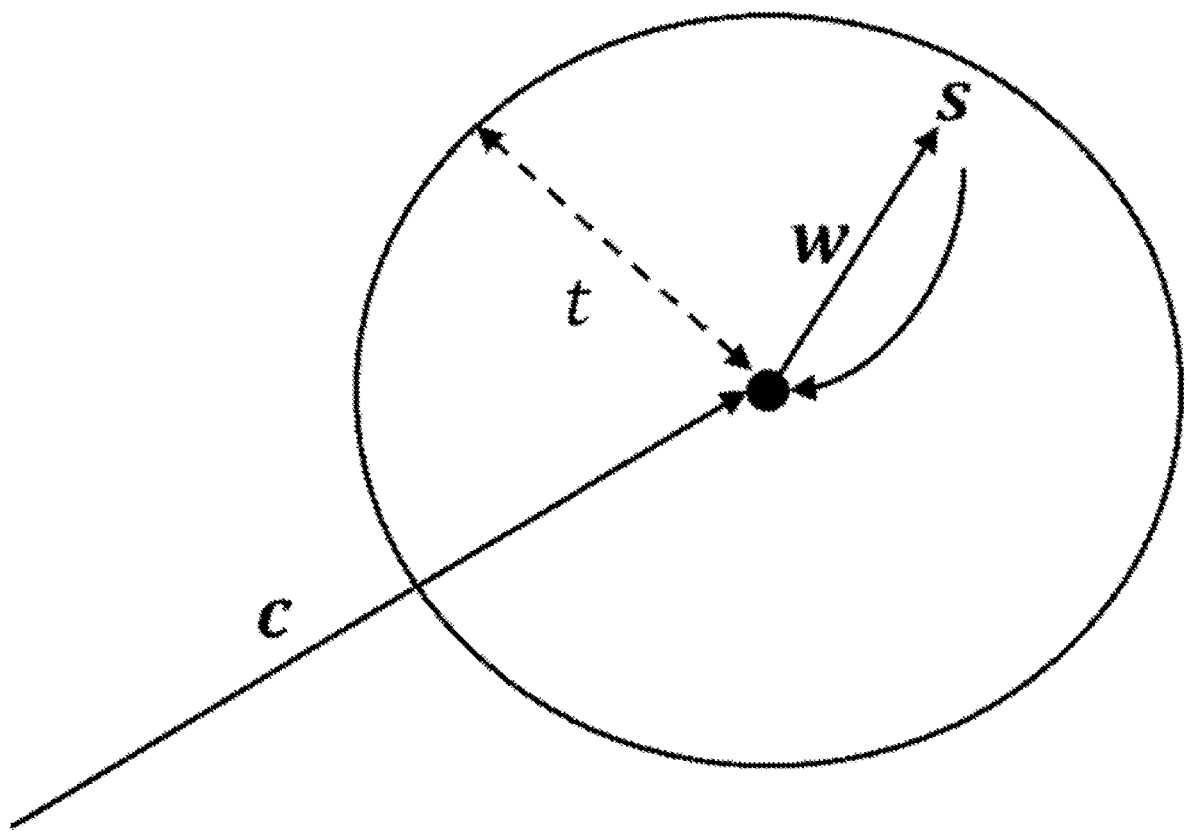
FIG. 5 is an explanatory diagram of a problem in the secure sketch according to the first example embodiment.

In the secure sketch, as illustrated in FIG. 4B, such data w that the sketch s is out of the range in which error correction is successfully performed with the codeword c has hitherto been assumed. However, as illustrated in FIG. 5, in a case of such data w that the sketch s is within the range in which error correction is successfully performed with the codeword c, by performing error correction on the sketch s itself with the codeword c, the data w can be reconfigured. In other words, in a case of such data w that the sketch s is within the range in which error correction is successfully performed with the codeword c, even if the data w' close to the data w is absent, the data w can be reconfigured with only the sketch s, and thus there is a problem in that the data w leaks.

As a countermeasure to such a problem, in the present example embodiment, with data such as the biometric information of the user being the data w, the data w is first converted into such data out of the range in which error correction is successfully performed with the codeword c, and the secure sketch is then performed. This configuration allows for reduction of risks of leakage of the data w from the sketch s.

2.5. Functional Configuration of Information Concealing Control Apparatus

Figure 6:
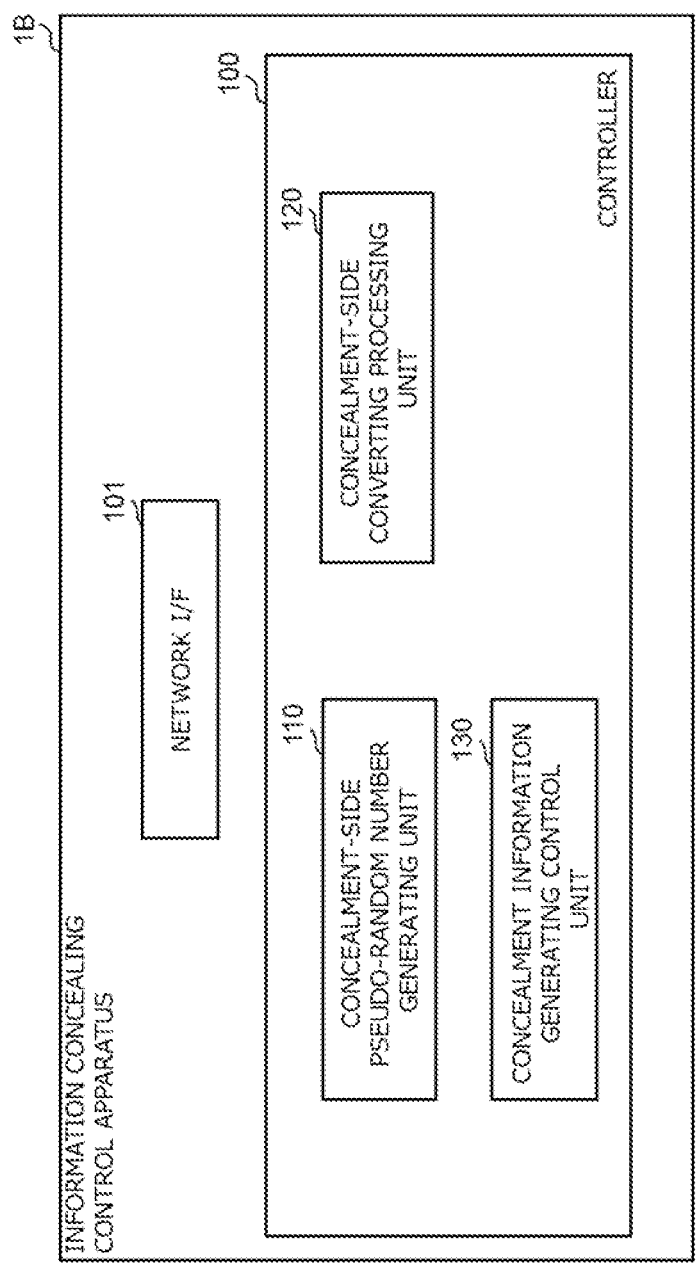
FIG. 6 is a functional block diagram illustrating a functional configuration of an information concealing control apparatus according to the first example embodiment.

Next, with reference to FIG. 6, a functional configuration of the information concealing control apparatus 1B will be described. FIG. 6 is a functional block diagram illustrating a functional configuration of the information concealing control apparatus 1B. As illustrated in FIG. 6, the information concealing control apparatus 1B includes a controller 100 and a network I/F 101.

The controller 100 performs acquisition of information from the user information input terminal 3, such as the biometric information of the user and a PIN, control of the secure sketch on the acquired biometric information of the user, and the like via the network I/F 101. The controller 100 is configured, with dedicated software or programs being installed in an information processing apparatus such as the information concealing control apparatus 1B. The controller 100 includes a concealment-side pseudo-random number generating unit 110, a concealment-side converting processing unit 120, and a concealment information generating control unit 130.

The concealment-side pseudo-random number generating unit 110 generates a pseudo-random number r', with a disposable temporary value (hereinafter referred to as "Nonce") and a PIN input to the information concealing control apparatus 1B being seeds. The PIN is identification information managed by the user who has input, to the user information input terminal 3, the biometric information (data w) to be input to the information concealing control apparatus 1B, and is, for example, information such as a four-digit number. Nonce is information that may be open to the public. The concealment-side pseudo-random number generating unit 110 is implemented with a pseudo-random number generator (hereinafter referred to as "PRNG") being a deterministic algorithm with which a sequence of numbers whose properties approximate those of random numbers can be generated (see FIG. 9).

The concealment-side converting processing unit 120 executes converting processing of converting the biometric information (data w) of the user input to the information concealing control apparatus 1B into data w (hat) by using the pseudo-random number r'. Specifically, the concealment-side converting processing unit 120 masks the data w by reversible computing the data w with the pseudo-random number r' to convert the data w into the data w (hat). The concealment-side converting processing unit 120 is implemented with a masking processing circuit (hereinafter referred to as "Mask") that performs masking processing on input data (see FIG. 9). The biometric information of the user input to the information concealing control apparatus 1B, in other words, the data w, corresponds to first information of the present example embodiment. The data w (hat) corresponds to first conversion information of the present example embodiment.

The concealment information generating control unit 130 causes the concealment information generating unit 1A to execute the secure sketch, based on the data w (hat) with the concealment information generating unit 1A. In a sketch s' output through the secure sketch based on the data w (hat), the biometric information of the user input to the information concealing control apparatus 1B, in other words, the data w, is concealed. The sketch s' output through the secure sketch on the data w (hat) corresponds to first concealment information of the present example embodiment.

According to the configuration described above, in the information concealing apparatus 1, the information concealing control apparatus 1B generates the data w (hat) obtained by converting the biometric information (data w) of the user with the pseudo-random number r'. Then, the concealment information generating unit 1A performs the secure sketch on the data w (hat), and the sketch s' as the first concealment information in which the data w (hat) is concealed is output.

Figure 7:
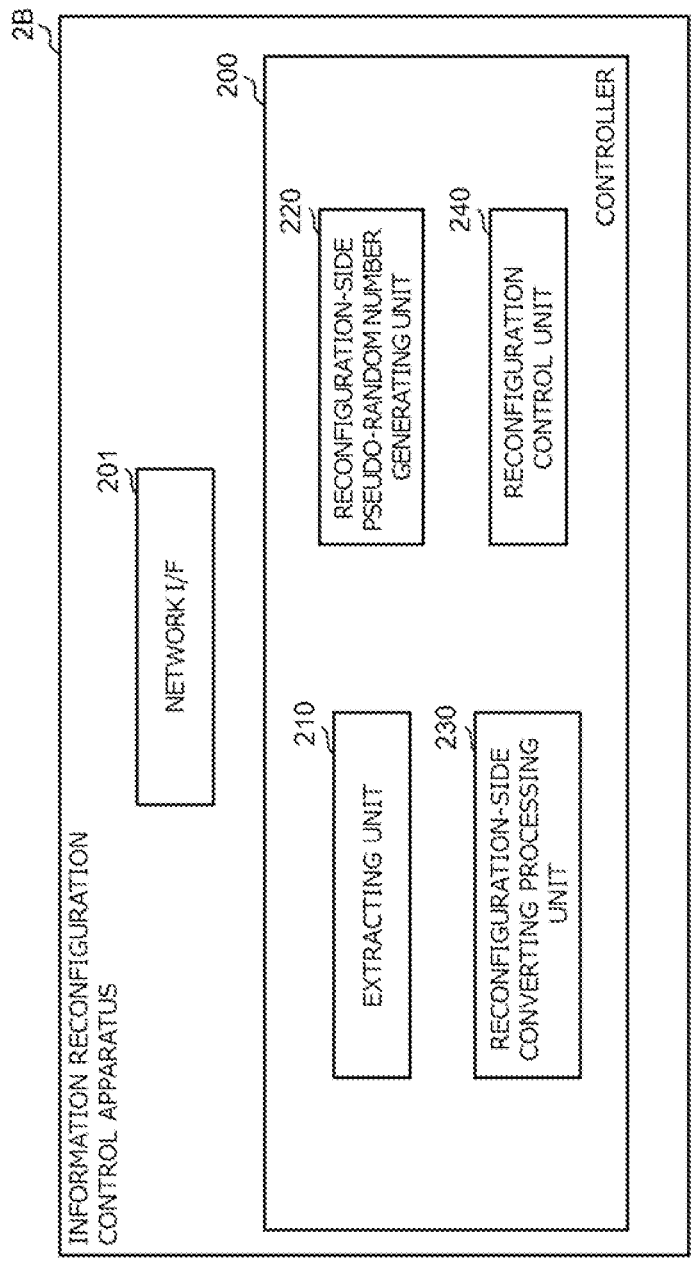
FIG. 7 is a functional block diagram illustrating a functional configuration of an information reconfiguration control apparatus according to the first example embodiment.

2.6. Functional Configuration of Information Reconfiguration Control Apparatus Next, with reference to FIG. 7, a functional configuration of the information reconfiguration control apparatus 2B will be described. FIG. 7 is a functional block diagram illustrating a functional configuration of the information reconfiguration control apparatus 2B. As illustrated in FIG. 7, the information reconfiguration control apparatus 2B includes a controller 200 and a network I/F 201.

The controller 200 performs acquisition of the biometric information of the user from the user information input terminal 3, acquisition of the sketch s' generated in the information concealing apparatus 1, and the like via the network I/F 201. The controller 200 controls reconfiguration of the information (the biometric information of the user, the data w) concealed in the sketch s'. The controller 200 is configured, with dedicated software or programs being installed in an information processing apparatus such as the information reconfiguration control apparatus 2B. The controller 200 includes an extracting unit 210, a reconfiguration-side pseudo-random number generating unit 220, a reconfiguration-side converting processing unit 230, and a reconfiguration control unit 240.

The extracting unit 210 extracts information related to seeds from the sketch s' generated by the information concealing apparatus 1. Specifically, the extracting unit 210 extracts Nonce concealed in the sketch s'.

The reconfiguration-side pseudo-random number generating unit 220 generates the pseudo-random number r', with Nonce extracted by the extracting unit 210 and the PIN input to the information reconfiguration control apparatus 2B being seeds. The PIN is identification information managed by the user who has input, to the user information input terminal 3, the biometric information (data w') to be input to the information reconfiguration control apparatus 2B, and is, for example, information such as a four-digit number. The reconfiguration-side pseudo-random number generating unit 220 is implemented with PRNG (see FIG. 9) being a deterministic algorithm with which a sequence of numbers whose properties approximate those of random numbers can be generated. In the present example embodiment, the user operates the user information input terminal 3, and transmits the same PIN to the information concealing control apparatus 1B and the information reconfiguration control apparatus 2B.

The reconfiguration-side converting processing unit 230 converts the biometric information (data w') input to the information reconfiguration control apparatus 2B into the data w' (hat) by using the pseudo-random number r'. Specifically, the reconfiguration-side converting processing unit 230 masks the data w' by reversible computing the data w' with the pseudo-random number r' to convert the data w' into the data w' (hat). The concealment-side converting processing unit 120 is implemented with Mask (see FIG. 9) that performs masking processing on input data. The biometric information of the user input to the information reconfiguration control apparatus 2B, in other words, the data w', corresponds to second information of the present example embodiment. The data w' (hat) corresponds to second conversion information of the present example embodiment.

The reconfiguration control unit 240 causes the reconfiguring unit 2A to execute reconfiguration, based on the sketch s' received from the information concealing apparatus 1 and the data w' (hat). In the sketch s', the biometric information of the user input to the information concealing control apparatus 1B, in other words, the data w, is concealed. As a result of the reconfiguration based on the sketch s' and the data w' (hat), the data w can be inferred from the sketch s'.

According to the configuration described above, in the information reconfiguring apparatus 2, the information reconfiguration control apparatus 2B converts the biometric information (data w') of the user input to the information reconfiguring apparatus 2. Then, the reconfiguring unit 2A is caused to reconfigure the codeword c from the concealment information (sketch s), based on the converted information. Then, the biometric information (data w') of the user input to the information reconfiguring apparatus 2 is error-corrected with the reconfigured codeword c, and the biometric information (data w) of the user input to the information concealing apparatus 1 is inferred.

2.7. Overview of Secure Sketch Using Error Correction Code

Figure 8:
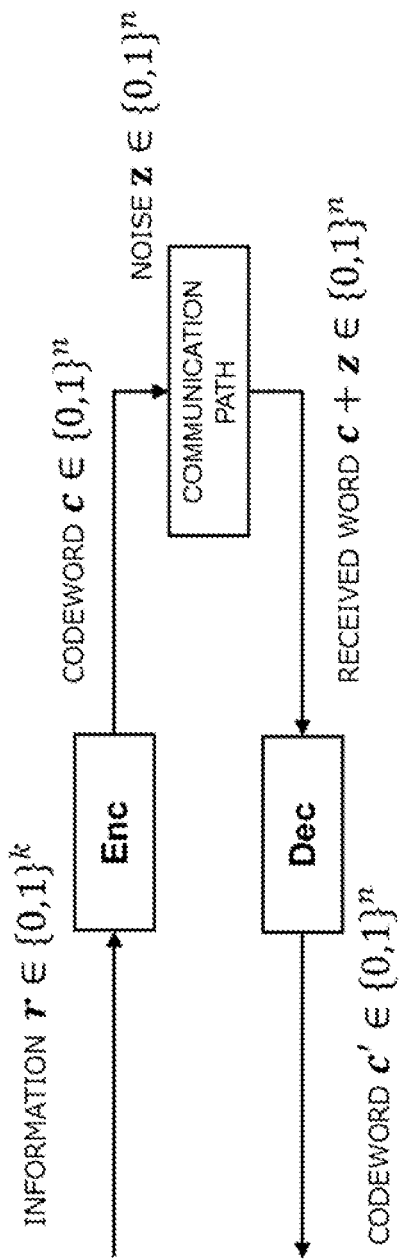
FIG. 8 is an explanatory diagram for illustrating a procedure in which an error occurring in a communication path is corrected using an error correction code according to the first example embodiment.

Next, an overview of the secure sketch using an error correction code will be described. First, with reference to FIG. 8, error correction technology will be described by taking an example of an (n, k, t)-binary linear code, which represents the number n of codeword bits, the number k of information bits, and error correction capability t (correction is possible for an error of t bits or less, in other words, the Hamming weight HW (e)≤t). FIG. 8 is an explanatory diagram for illustrating a procedure in which an error occurring in a communication path is corrected using an error correction code. Note that, with an example of a BCH code, FIG. 8 illustrates an error correction procedure when information $$r \in \{0,1\}^k \qquad \text{[Math. 12]}$$

having a length of k bits with each bit being a value of 0 or 1 is transmitted via a binary communication path. In FIG. 8, a flow of data is indicated by the arrow in the solid line.

The information r having a length of k bits with each bit being a value of 0 or 1 is coded by a coder into a codeword $$c \in \{0,1\}^n \qquad \text{[Math. 13]}$$

having a length of n bits with each bit being a value of 0 or 1. In the codeword c having a length of n bits with each bit being a value of 0 or 1, a noise

[Math. 14]

$$z \in \{0,1\}^n \quad \text{[Math. 14]}$$

having a length of n bits with each bit being a value of 0 or 1 occurs in a process of being transmitted in the communication path. As a result, a decoder receives a received word $$c+z \in \{0,1\}^n \quad \text{[Math. 15]}$$

having a length of n bits with each bit being a value of 0 or 1. Then, the received word c+z having a length of n bits with each bit being a value of 0 or 1 is error-corrected by the decoder, to be a codeword c' having a length of n bits with each bit being a value of 0 or 1.

Next, an overview of the secure sketch using the error correction code is considered. Here, it is assumed that the data $$w \in \{0,1\}^n \quad \text{[Math. 16]}$$

is distributed on a length of n bits with each bit being a value of 0 or 1, and the data w' close to the data w satisfies HW (w-w')≤t. Here, the secure sketch using the error correction code will be described by taking an example of an (n, k, t) binary linear code (for example, a BCH code), which represents the number n of codeword bits, the number k of information bits, and error correction capability t (correction is possible for an error of t bits or less, in other words, the Hamming weight HW (e)≤t).

First, a procedure in which the sketch s is output with an input being the data w distributed on a length of n bits consisting of {0, 1} in a secure sketch algorithm ($SS_{ecc}$) using the error correction code will be described. It is assumed that the data w distributed on a length of n bits with each bit being a value of 0 or 1 is input to the secure sketch algorithm ($SS_{ecc}$) using the error correction code. First, the random number r having a length of k bits with each bit being a value of 0 or 1 is generated, and the generated random number r is coded by the coding function Enc into the codeword c having a length of n bits with each bit being a value of 0 or 1 (Expression 2-1).

$$c := \mathrm{Enc}(r) \ldots \text{Expression 2-1)} \quad \text{[Math. 17]}$$

In (Expression 2-1), the random number r having a length of k bits with each bit being a value of 0 or 1 is generated such that the codeword c having a length of n bits with each bit being a value of 0 or 1 can error-correct the data w having a length of n bits with each bit being a value of 0 or 1. Specifically, the random number r is generated such that t-bit error correction can be successfully performed with the codeword c with each bit being a value of 0 or 1. Next, in the secure sketch algorithm ($SS_{ecc}$) using the error correction code, a value obtained by reversibly computing the codeword c with each bit being a value of 0 or 1 and the data w with each bit being a value of 0 or 1 is output as the sketch s (Expression 2-2). In the present example embodiment, the concealment information generating unit 1A corresponds to a software module that generates the concealment information in which the biometric information of the user is concealed, based on the biometric information of the user through the secure sketch algorithm ($SS_{ecc}$) using the error correction code.

$$s := c + w \in \{0,1\}^n \ldots \text{(Expression 2-2)} \quad \text{[Math. 18]}$$

Next, a procedure in which the data w is output based on the sketch s having a length of n bits with each bit being a value of 0 or 1 and the data w' having a length of n bits with each bit being a value of 0 or 1 in a reconfiguration algorithm ($\mathrm{Rec}_{ecc}$) using the error correction code will be described.

Here, it is assumed that the data w' being HW (w-w')≤t is input to the reconfiguration algorithm ($\mathrm{Rec}_{ecc}$) using the error correction code. In the reconfiguration algorithm ($\mathrm{Rec}_{ecc}$) using the error correction code, the sketch s having a length of n bits with each bit being a value of 0 or 1 is decoded by the decoding function Dec, based on the data w' having a length of n bits with each bit being a value of 0 or 1, and the codeword c (tilde) closest to the input data w' is output (Expression 2-3).

$$\tilde{c} := \mathrm{Dec}(s-w') \ldots \text{(Expression 2-3)} \quad \text{[Math. 19]}$$

The data w (tilde) output from the reconfiguration algorithm ($\mathrm{Rec}_{ecc}$) using the error correction code is defined by the sketch s and the codeword c (tilde) closest to the input data w', as in (Expression 2-4).

$$\tilde{w} := s - \tilde{c} \in \{0,1\}^n \ldots \text{(Expression 2-4)} \quad \text{[Math. 20]}$$

Here, from (Expression 2-2), (Expression 2-3) is expressed as follows.

$$\mathrm{Dec}(s-w') = \mathrm{Dec}(c+w-w') \in \{0,1\}^n \ldots \text{(Expression 2-5)} \quad \text{[Math. 21]}$$

HW (w-w')≤t, and thus the difference w-w' can be error-corrected owing to the properties of the (n, k, t)-binary linear code described with reference to FIG. 8. In this case, it can be derived that, by performing error correction on the difference w-w' of (Expression 2-5), the codeword c (tilde) closest to the input data w' having a length of n bits with each bit being a value of 0 or 1 is equal to the codeword c having a length of n bits with each bit being a value of 0 or 1 (Expression 2-6).

$$\tilde{c} = c \in \{0,1\}^n \ldots \text{(Expression 2-6)} \quad \text{[Math. 22]}$$

Then, from (Expression 2-6) and (Expression 2-4), the data w having a length of n bits with each bit being a value of 0 or 1 is reconfigured, and is output as w (tilde) (Expression 2-7).

$$\tilde{w} = s - \tilde{c} \in \{0,1\}^n \, w \in \{0,1\}^n \ldots \text{(Expression 2-7)} \quad \text{[Math. 23]}$$

In the present example embodiment, the reconfiguring unit 2A corresponds to a software module that reconfigures the biometric information (data w) of the user through the reconfiguration algorithm ($\mathrm{Rec}_{ecc}$) using the error correction code.

2.8. Overview of Secure Sketch and Reconfiguration Using PIN

Figure 9:
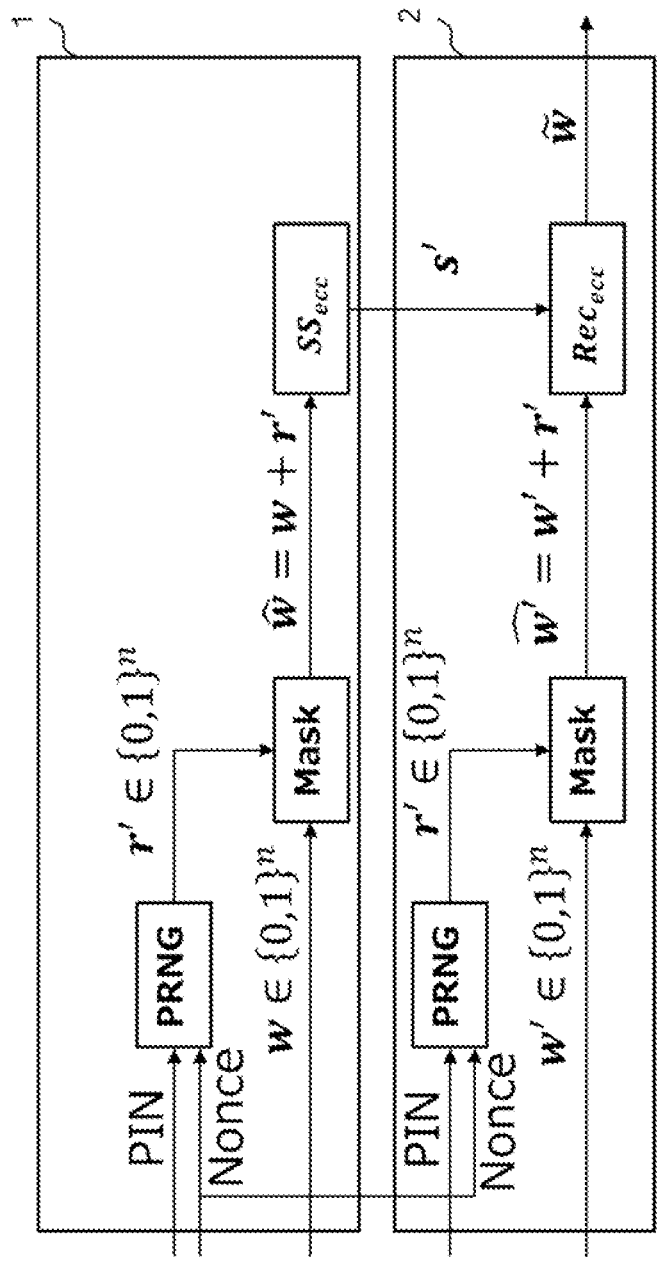
FIG. 9 is an explanatory diagram illustrating a flow of handling data in the secure sketch and the reconfiguration in the information concealing system according to the first example embodiment.
Figure 10:
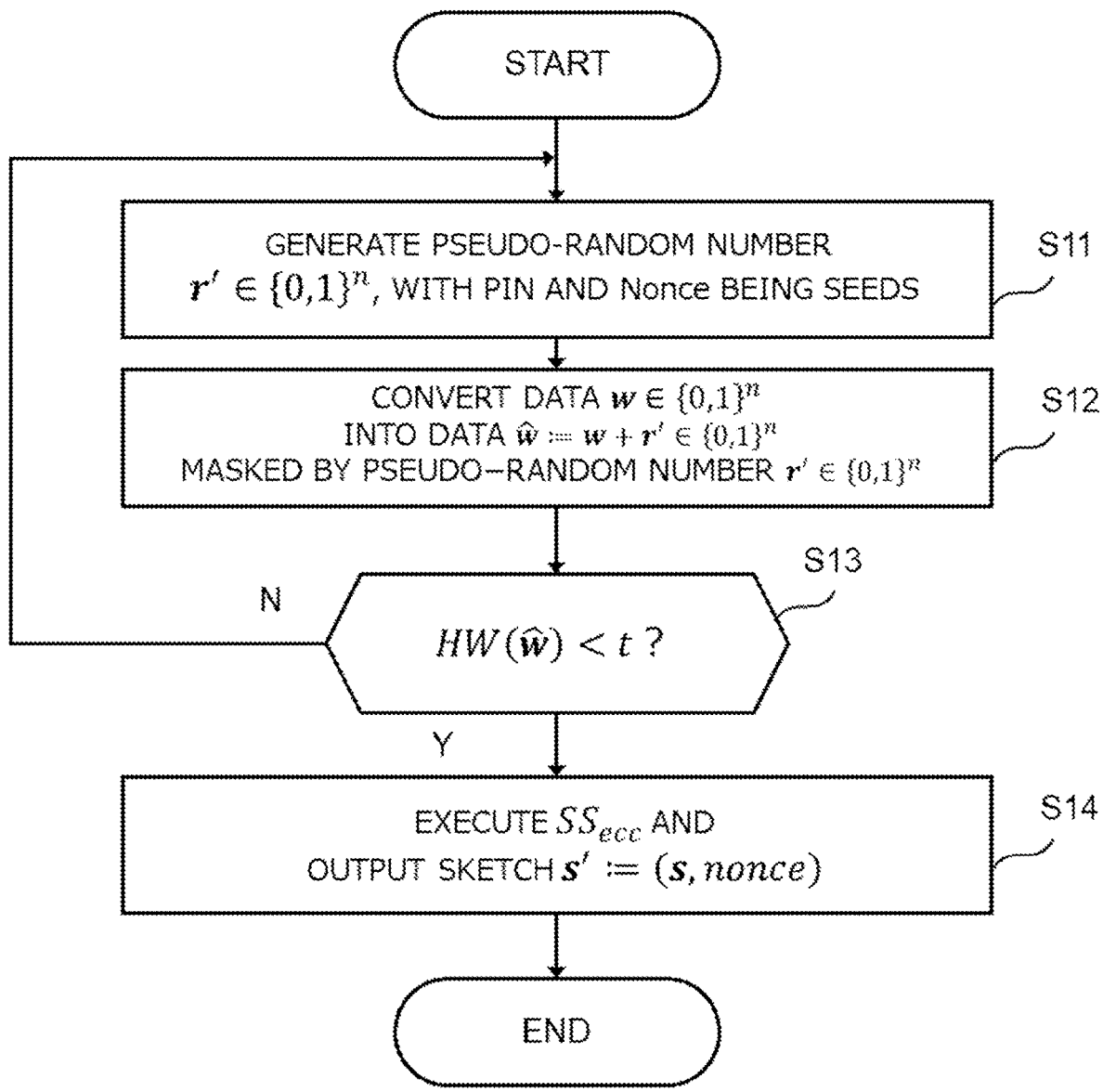
FIG. 10 is a flowchart illustrating a flow of the secure sketch performed with the error correction code using a PIN according to the first example embodiment.
Figure 11:
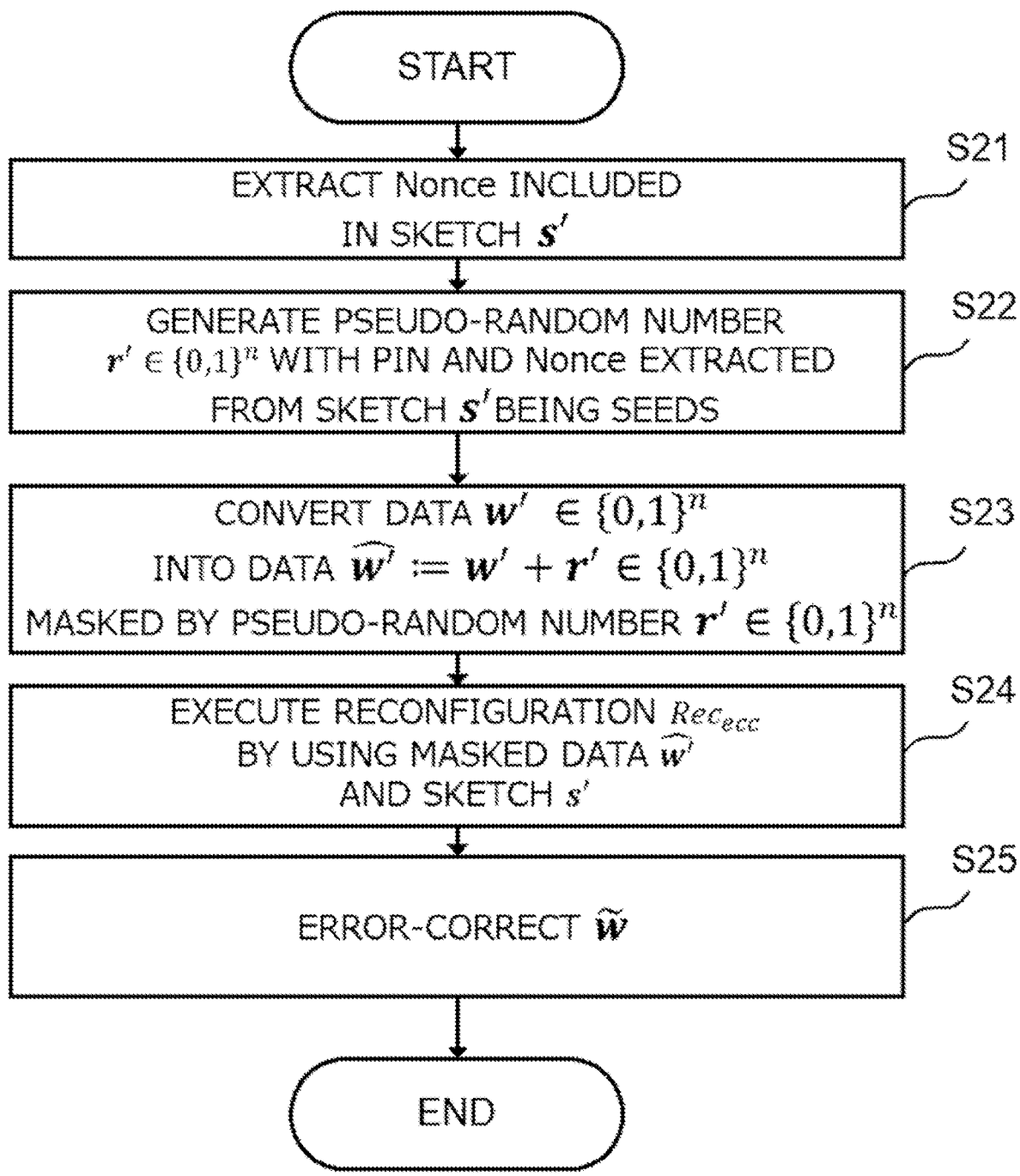
FIG. 11 is a flowchart illustrating a flow of the reconfiguration performed with the error correction code using a PIN according to the first example embodiment.
Figure 12A:
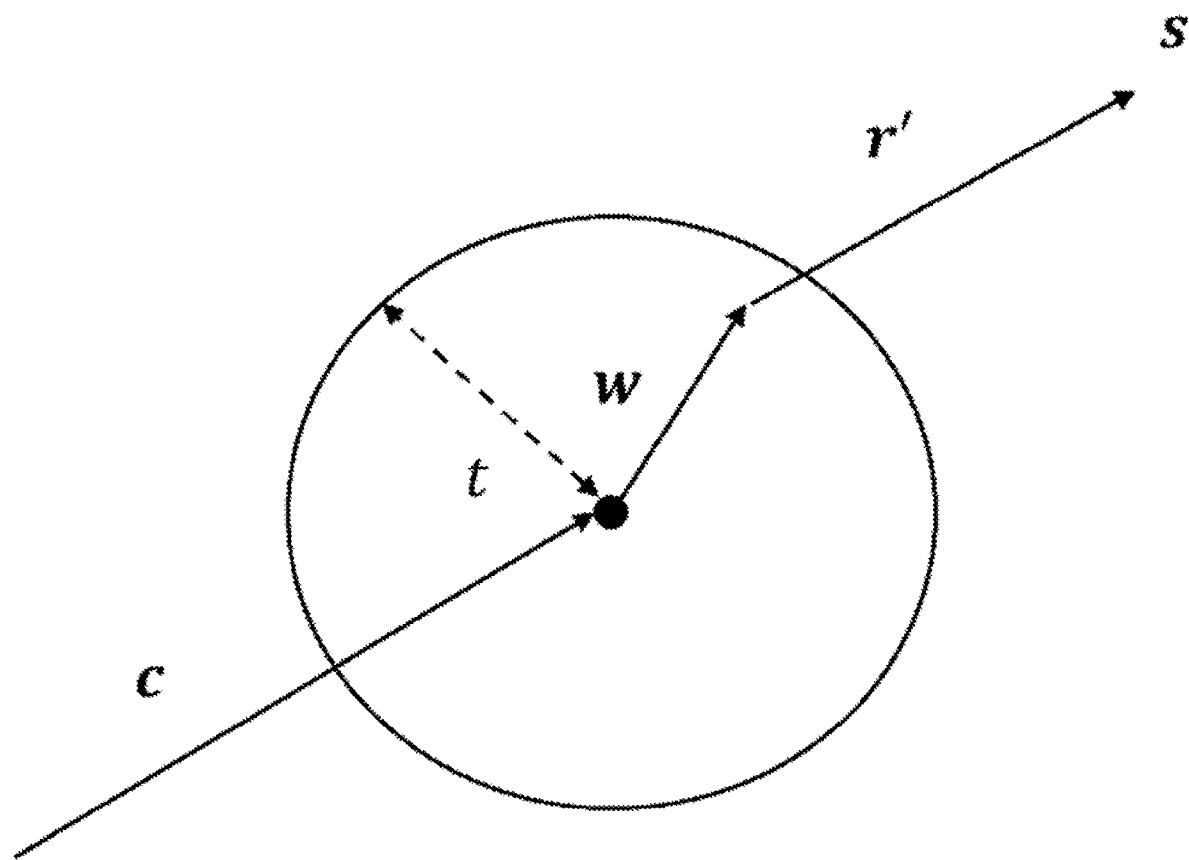
FIG. 12A is an explanatory diagram illustrating a modeled secure sketch in the information concealing system according to the first example embodiment.
Figure 12B:
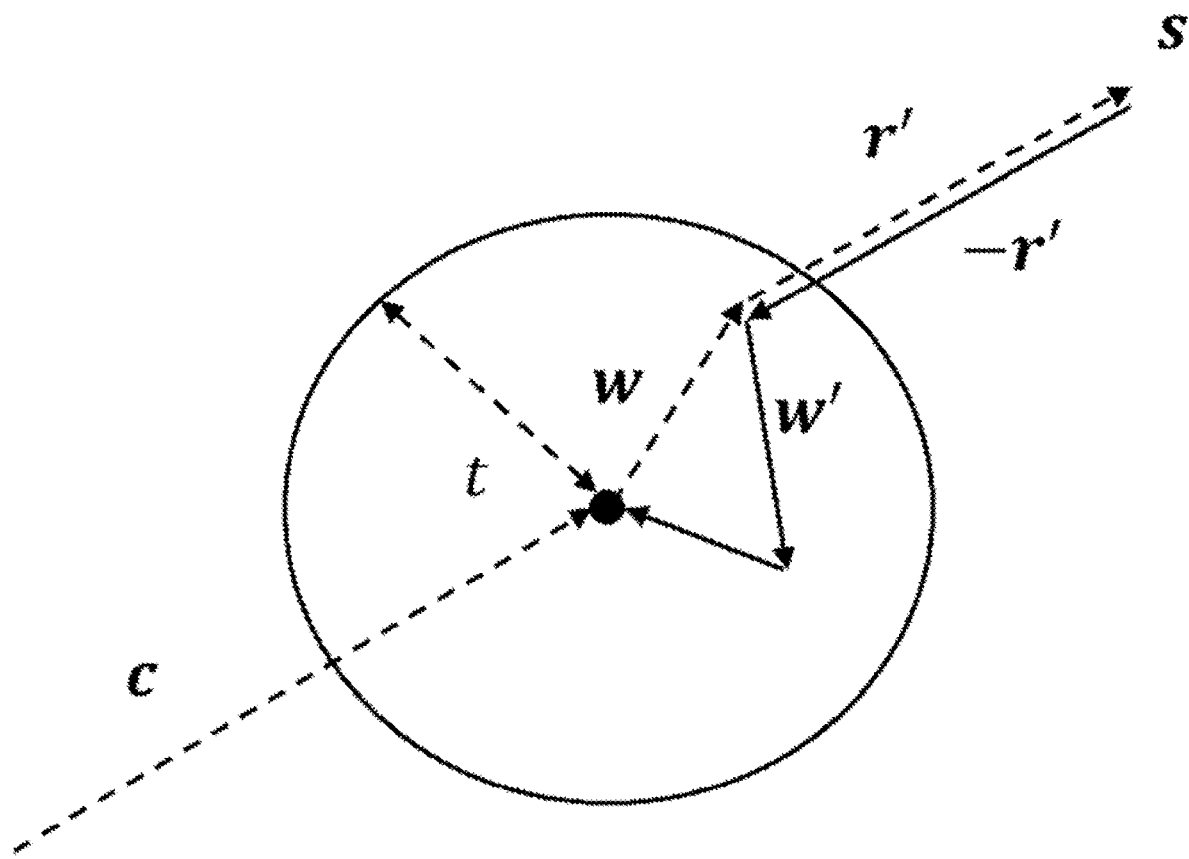
FIG. 12B is an explanatory diagram illustrating a modeled secure sketch in the information concealing system according to the first example embodiment.

Next, with reference to FIG. 9 to FIG. 12A and FIG. 12B, an overview of the secure sketch using a PIN according to the present example embodiment will be described. FIG. 9 is an explanatory diagram illustrating a flow of handling data in the secure sketch and the reconfiguration in the information concealing system. FIG. 10 is a flowchart illustrating a flow of the secure sketch performed with the error correction code using a PIN. FIG. 11 is a flowchart illustrating a flow of the reconfiguration performed with the error correction code using a PIN. FIG. 12A and FIG. 12B are each an explanatory diagram illustrating a modeled secure sketch in the information concealing system.

Here, description will be given by taking an example of an (n, k, t) binary linear code (for example, a BCH code), which represents the number n of codeword bits, the number k of information bits, and error correction capability t (correction is possible for an error oft bits or less, in other words, the Hamming weight HW (e)≤t). It is assumed that the data $$w \in \{0,1\}^n \quad \text{[Math. 24]}$$

is data having an error oft bits or less distributed on a length of n bits with each bit being a value of 0 or 1. In description of <<2.8.>>, the data w having a length of n bits with each bit being a value of 0 or 1 may be simply referred to as "data w".

First, with reference to FIG. 9, FIG. 10, and FIG. 12A, secure sketch processing in the information concealing apparatus 1 will be described. Here, description will be given on an assumption that, as illustrated in FIG. 9, the data w being the biometric information of the user, a PIN managed by the user who has input the data w, and disposable Nonce are input to the information concealing control apparatus 1B from the user information input terminal 3. Note that Nonce may be generated in the user information input terminal 3, or may be generated in the information concealing apparatus 1.

In Step S11, the concealment-side pseudo-random number generating unit 110 generates the pseudo-random number r' having a length of n bits with each bit being a value of 0 or 1, with the PIN and Nonce being seeds (Expression 3-1). In description of <<2.8.>>, the pseudo-random number r' having a length of n bits with each bit being a value of 0 or 1 may be simply referred to as a "pseudo-random number r'".

$$r' \in \{0,1\}^n \ldots \text{(Expression 3-1)} \quad \text{[Math. 25]}$$

In Step S12, the concealment-side converting processing unit 120 masks the data w input to the information concealing control apparatus 1B with the pseudo-random number r' generated in Step S11 to convert the data w into the data w (hat) (Expression 3-2).

$$\hat{w} := w + r' \in \{0,1\}^n \ldots \text{(Expression 3-2)} \quad \text{[Math. 26]}$$

In Step S13, when the Hamming weight HW (w (hat)) of the data w (hat) is smaller than the correction capability t of the error correction code, the concealment information generating control unit 130 returns to Step S11 (S13/N). In contrast, when the Hamming weight HW (w (hat)) of the data w (hat) is equal to or greater than the correction capability t of the error correction code, the concealment information generating control unit 130 proceeds to Step S14 (S13/Y). A first value of the present example embodiment corresponds to the error correction capability t of the error correction code embedded in the data w (hat) as the private key.

In Step S14, the concealment information generating control unit 130 causes the concealment information generating unit 1A to execute the secure sketch on the data w (hat). The concealment information generating unit 1A performs the secure sketch on the data w (hat), and outputs the sketch s' (Expression 3-3).

$$s' := (s, \text{nonce}) \ldots \text{(Expression 3-3)} \quad \text{[Math. 27]}$$

The concealment information (sketch s', see Expression 3-3) generated by the information concealing apparatus 1 is transmitted to the information reconfiguring apparatus 2 via the network 4. As illustrated in FIG. 12A, the sketch s' has the data w being masked with the pseudo-random number r', and is thus data that cannot be error-corrected with the error correction code.

Next, with reference to FIG. 9, FIG. 11, and FIG. 12B, reconfiguration processing in the information reconfiguring apparatus 2 will be described. Here, it is assumed that the biometric information of the user transmitted from the user information input terminal 3 to the information reconfiguring apparatus 2 is the data distributed on a length of n bits consisting of {0, 1} as follows.

$$w' \in \{0,1\}^n \quad \text{[Math. 28]}$$

In description of <<2.8.>>, the data w' having a length of n bits with each bit being a value of 0 or 1 may be simply referred to as "data w'".

It is assumed that the data w' is data close to the data w. The PIN input to the information reconfiguring apparatus 2 is data managed by the user who has input the data w'. In the present example embodiment, it is assumed that the data w and the data w' are biometric information such as a fingerprint of the same user, and a PIN the same as the PIN used in S11 is input.

In Step S21, the extracting unit 210 extracts Nonce from the sketch s' received from the information concealing apparatus 1. Note that the information concealing apparatus 1 may transmit to the information reconfiguring apparatus 2 such that Nonce is not included in the sketch s'.

In Step S22, the reconfiguration-side pseudo-random number generating unit 220 generates the pseudo-random number.

$$r' \in \{0,1\}^n \ldots \text{(Expression 3-4)} \quad \text{[Math. 29]}$$

with the PIN input to the information reconfiguration control apparatus 2B and Nonce being seeds (Expression 3-4). In this case, for example, on the assumption that "0123" is used as the PIN in Step S11 and when the PIN input to the information reconfiguration control apparatus 2B is "0123", the pseudo-random number r' may be generated with the PIN and Nonce being seeds. In other words, the pseudo-random number r' is generated when the PINS in Step S11 and Step S22 match. Accordingly, the pseudo-random number r' generated in Step S22 matches the pseudo-random number r' generated in Step S11.

In Step S23, the reconfiguration-side converting processing unit 230 masks the data w' input to the information reconfiguration control apparatus 2B with the pseudo-random number r' generated in Step S22 to convert the data w' into the data w' (hat) (Expression 3-5).

$$\widehat{w'} := w' + r' \in \{0,1\}^n \ldots \text{(Expression 3-5)} \quad \text{)[Math. 30]}$$

In Step S24, the reconfiguration control unit 240 causes the reconfiguring unit 2A to execute reconfiguration, based on the data w' (hat) generated in Step S23 and the sketch s' (Expression 3-6).

[Math. 31]

$$\tilde{c} = Dec(s' - \widehat{w'}) = Dec(c + \hat{w} - \widehat{w'}) \quad \text{(Expression 3-6)}$$
$$= Dec(c + w + r' - (w' + r'))$$
$$= Dec(c + w - w') \in \{0,1\}^n$$

The reconfiguring unit 2A performs reconfiguration based on the data w' (hat) and the sketch s', and in Step S25, the reconfiguring unit 2A performs error correction on the data w' with the codeword c and then outputs the data w.

In this manner, the information reconfiguring apparatus 2 can infer the data w (the biometric information of the user input to the information concealing apparatus 1) concealed in the sketch s', based on the concealment information (sketch s', see Expression 3-3) generated by the information concealing apparatus 1 and the biometric information (data w') of the user. In this case, as illustrated in FIG. 12B, in order to infer the data w concealed in the sketch s', it is necessary that the data w and the data w' are data close to each other, in other words, the Hamming distance between the data w and the data w' is within the range in which error correction can be successfully performed with the codeword c. The Hamming distance between the data w and the data w' when error correction can be successfully performed with the codeword c corresponds to a predetermined value of the present example embodiment. Accordingly, when biometric information of a user different from the user corresponding to the data w is input to the information reconfiguring apparatus 2, the data w is failed to be reconfigured, and therefore leakage of the biometric information can be reduced. The sketch s' transmitted from the information concealing apparatus 1 has a length to be out of the range in which error correction is successfully performed with the codeword c, and the data w is failed to be reconfigured with only the sketch s'. In other words, information leakage risks in the information concealing system 1000 can be further reduced, and security can be enhanced.

3. Second Example Embodiment

Figure 13:
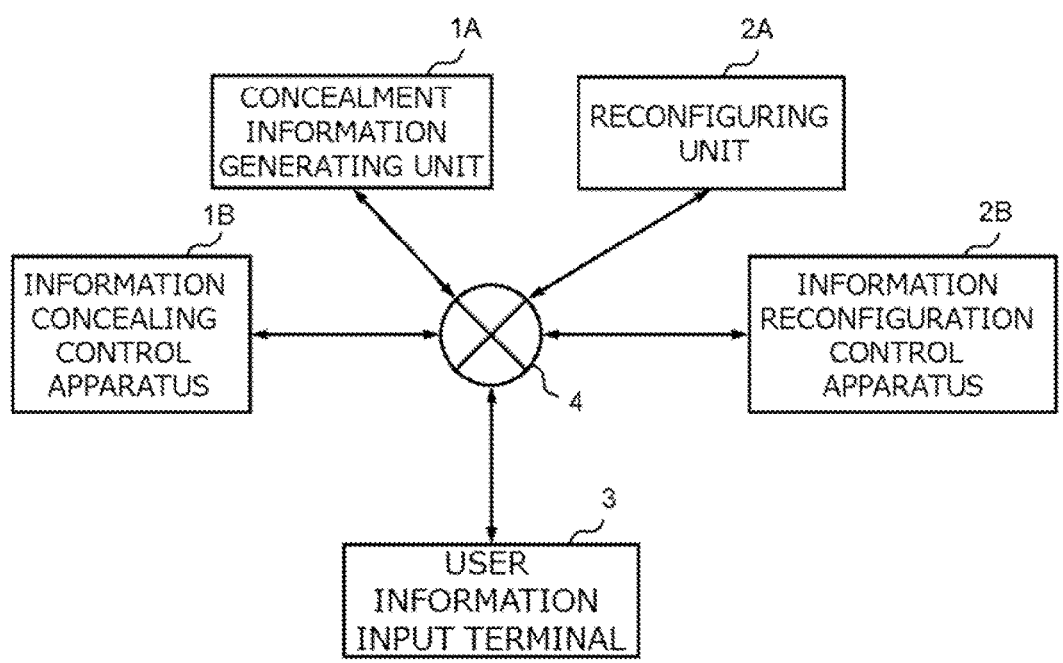
FIG. 13 is a diagram illustrating an operation mode of an information concealing system according to a second example embodiment.

Next, with reference to FIG. 13, a second example embodiment of the present invention will be described. FIG. 13 is a diagram illustrating an operation mode of an information concealing system 1000B according to the second example embodiment. The first example embodiment has described the information concealing system 1000, which includes the information concealing apparatus 1 including the concealment information generating unit 1A and the information concealing control apparatus 1B, and the information reconfiguring apparatus 2 including the reconfiguring unit 2A and the information reconfiguration control apparatus 2B.

The present example embodiment is different from the first example embodiment in that the concealment information generating unit 1A is implemented in an external apparatus connected via the network 4 for the information concealing control apparatus 1B, and that the reconfiguring unit 2A is implemented in an external apparatus connected via the network 4 for the information reconfiguration control apparatus 2B. Functional configurations of the information concealing control apparatus 1B and the information reconfiguration control apparatus 2B and specific operations of the secure sketch are similar to those in the first example embodiment. In the case described above, description regarding the first example embodiment can also be applied to the second example embodiment.

4. Third Example Embodiment

Next, with reference to FIG. 14 to FIG. 16, a third example embodiment of the present invention will be described. The first example embodiment and the second example embodiment described above are specific example embodiments, whereas the third example embodiment is a more generalized example embodiment. According to the third example embodiment to be described below, technical effects similar to those of the first example embodiment and the second example embodiment are exerted.

Figure 14:
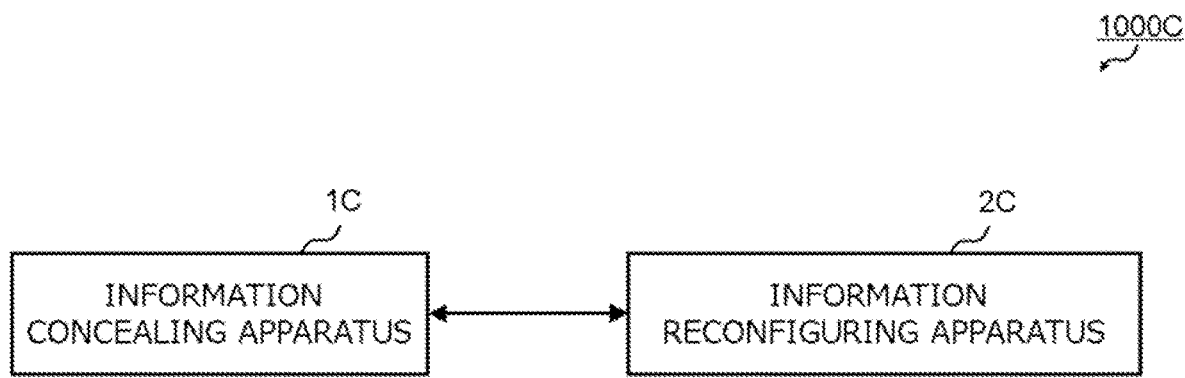
FIG. 14 is a diagram illustrating an operation mode of an information concealing system according to a third example embodiment.

FIG. 14 is a block diagram illustrating a schematic configuration of an information concealing system 1000C according to the third example embodiment of the present invention. As illustrated in FIG. 14, the information concealing system 1000C includes an information concealing apparatus 1C and an information reconfiguring apparatus 2C.

Figure 15:
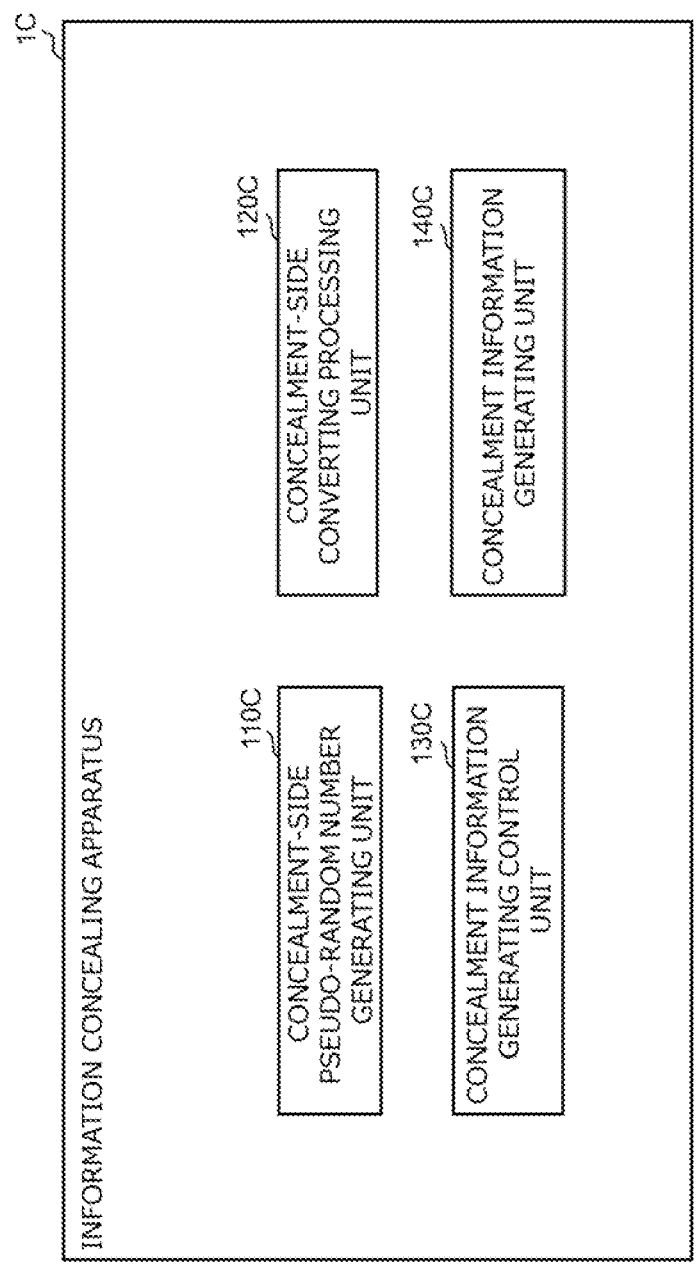
FIG. 15 is a functional block diagram illustrating a functional configuration of an information concealing apparatus according to the third example embodiment.

FIG. 15 is a block diagram illustrating a schematic configuration of the information concealing apparatus 1C according to the third example embodiment. The information concealing apparatus 1C includes a concealment-side pseudo-random number generating unit 110C, a concealment-side converting processing unit 120C, a concealment information generating control unit 130C, and a concealment information generating unit 140C.

The concealment-side pseudo-random number generating unit 110C generates a pseudo-random number from a seed. The concealment-side converting processing unit 120C performs converting processing of converting input first information into first conversion information by using the pseudo-random number. The concealment information generating control unit 130C causes the concealment information generating unit 140C to generate first concealment information with which the first information can be reconfigured, based on the first conversion information. The concealment information generating unit 140C generates concealment information, based on input information.

FIG. 16 is a block diagram illustrating a schematic configuration of the information reconfiguring apparatus 2C according to the third example embodiment. The information reconfiguring apparatus 2C includes an extracting unit 210C, a reconfiguration-side pseudo-random number generating unit 220C, a reconfiguration-side converting processing unit 230C, a reconfiguration control unit 240C, and a reconfiguring unit 250C.

The extracting unit 210C extracts information related to a seed from first concealment information. The reconfiguration-side pseudo-random number generating unit 220C generates a reconfiguration-side pseudo-random number, based on the information related to the seed. The reconfiguration-side converting processing unit 230C converts input second information into second conversion information by using the reconfiguration-side pseudo-random number. The reconfiguration control unit 240C causes the reconfiguring unit 250C to reconfigure first information concealed as the first concealment information, based on the second conversion information and the first concealment information. The reconfiguring unit 250C can reconfigure information concealed as concealment information.

Relationship with First Example Embodiment

As an example, the information concealing apparatus 1C according to the third example embodiment may execute operations of the information concealing apparatus 1 according to the first example embodiment. Similarly, as an example, the information reconfiguring apparatus 2C according to the third example embodiment may execute operations of the information reconfiguring apparatus 2 according to the first example embodiment. Similarly, as an example, the information concealing system 1000C according to the third example embodiment may be configured similarly to the information concealing system 1000 according to the first example embodiment. In the case described above, description regarding the first example embodiment can also be applied to the third example embodiment. Note that the third example embodiment is not limited to the examples described above.

5. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the corresponding flowchart. For example, the steps in the processing may be executed in an order different from that described in the corresponding flowchart or may be executed in parallel. Some of the steps in the processing may be deleted, or more steps may be added to the processing.

An apparatus including constituent elements (the concealment-side pseudo-random number generating unit, the concealment-side converting processing unit, the concealment information generating control unit, and/or the concealment information generating unit) of the information concealing apparatus described in the Specification (e.g., one or more apparatuses (or units) among a plurality of apparatuses (or units) constituting the information concealing apparatus or a module for one of the plurality of apparatuses (or units)) may be provided. An apparatus including constituent elements (the extracting unit, the reconfiguration-side pseudo-random number generating unit, the reconfiguration-side converting processing unit, the reconfiguration control unit, and/or the reconfiguring unit) of the information reconfiguring apparatus described in the Specification (e.g., one or more apparatuses (or units) among a plurality of apparatuses (or units) constituting the information reconfiguring apparatus or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

Supplementary Note 1

An information concealing control apparatus comprising:
a concealment-side pseudo-random number generating unit configured to generate a pseudo-random number from a seed;
a concealment-side converting processing unit configured to perform converting processing of converting first information being input into first conversion information by using the pseudo-random number; and
a concealment information generating control unit configured to cause a concealment information generating unit generating concealment information based on input information to generate first concealment information capable to reconfigure the first information, based on the first conversion information.

Supplementary Note 2

The information concealing control apparatus according to supplementary note 1, wherein
the concealment information generating control unit is configured to cause the concealment information generating unit to generate the concealment information when a Hamming weight of the first conversion information is equal to or greater than a first value.

Supplementary Note 3

The information concealing control apparatus according to supplementary note 2, wherein
the first value is error correction capability of a private key embedded in the first conversion information by the concealment information generating unit.

Supplementary Note 4

The information concealing control apparatus according to any one of supplementary notes 1 to 3, wherein
the first information is biometric information.

Supplementary Note 5

The information concealing control apparatus according to supplementary note 4, wherein
the seed includes identification information managed by a user who has input the biometric information.

Supplementary Note 6

The information concealing control apparatus according to any one of supplementary notes 1 to 5, wherein
the seed includes a disposable temporary value.

Supplementary Note 7

The information concealing control apparatus according to any one of supplementary notes 1 to 6, wherein
the converting processing includes reversible computing of the first information and the pseudo-random number.

Supplementary Note 8

An information concealing apparatus comprising:
the information concealing control apparatus according to any one of supplementary notes 1 to 7; and
the concealment information generating unit.

Supplementary note 9

An information reconfiguration control apparatus comprising:
an extracting unit configured to extract information related to a seed from first concealment information generated by a concealment information generating unit generating concealment information based on input information, the first concealment information being capable to reconfigure first information;
a reconfiguration-side pseudo-random number generating unit configured to generate a reconfiguration-side pseudo-random number, based on the information related to the seed being extracted;
a reconfiguration-side converting processing unit configured to convert input second information into second conversion information by using the reconfiguration-side pseudo-random number; and a reconfiguration control unit configured to cause a reconfiguring unit configured to reconfigure information concealed as the concealment information to reconfigure the first information concealed as the first concealment information, based on the second conversion information and the first concealment information.

Supplementary Note 10

The information reconfiguration control apparatus according to supplementary note 9, wherein
the reconfiguration control unit is configured to cause the reconfiguring unit to reconfigure the first information concealed as the concealment information when a Hamming distance between the first information and the second information is equal to or less than a predetermined value.

Supplementary Note 11

The information reconfiguration control apparatus according to supplementary note 9 or wherein
the first information and the second information are biometric information.

Supplementary Note 12

The information reconfiguration control apparatus according to supplementary note 11, wherein
the reconfiguration-side pseudo-random number generating unit is configured to generate the reconfiguration-side pseudo-random number by using identification information managed by a user who has input the biometric information and the information related to the seed.

Supplementary Note 13

The information reconfiguration control apparatus according to any one of supplementary notes 9 to 12, wherein
the information related to the seed includes a disposable temporary value.

Supplementary Note 14

An information reconfiguring apparatus comprising:
the information reconfiguration control apparatus according to any one of supplementary notes 9 to 13; and
the reconfiguring unit.

Supplementary Note 15

An information concealing system comprising:
the information concealing apparatus according to supplementary note 8; and
the information reconfiguring apparatus according to supplementary note 14.

Supplementary Note 16

An information concealing control method comprising:
generating a pseudo-random number from a seed;
performing converting processing of converting first information being input into first conversion information by using the pseudo-random number; and
causing a concealment information generating unit generating concealment information based on input information to generate first concealment information capable to reconfigure the first information, based on the first conversion information.

Supplementary Note 17

An information reconfiguration control method comprising:
extracting information related to a seed from first concealment information generated by a concealment information generating unit generating concealment information based on input information, the first concealment information being capable to reconfigure first information;
generating a reconfiguration-side pseudo-random number by using the seed being extracted;
converting input second information into second conversion information by using the reconfiguration-side pseudo-random number; and
causing a reconfiguring unit configured to reconfigure information concealed as the concealment information to reconfigure the first information concealed as the first concealment information, based on the second conversion information and the first concealment information.

Supplementary Note 18

An information concealing control program causing a computer to execute:
generating a pseudo-random number from a seed;
performing converting processing of converting first information being input into first conversion information by using the pseudo-random number; and
causing a concealment information generating unit generating concealment information based on input information to generate first concealment information capable to reconfigure the first information, based on the first conversion information.

Supplementary Note 19

An information reconfiguration control program causing a computer to execute:
extracting information related to a seed from first concealment information generated by a concealment information generating unit generating concealment information based on input information, the first concealment information being capable to reconfigure first information;
generating a reconfiguration-side pseudo-random number by using the seed being extracted;
converting input second information into second conversion information by using the reconfiguration-side pseudo-random number; and
causing a reconfiguring unit configured to reconfigure information concealed as the concealment information to reconfigure the first information concealed as the first concealment information, based on the second conversion information and the first concealment information.

INDUSTRIAL APPLICABILITY

An information concealing control apparatus, an information concealing apparatus, an information reconfiguration control apparatus, an information reconfiguring apparatus, an information concealing system, an information concealing control method, an information reconfiguration control method, an information concealing control program, and an information reconfiguration control program to reduce information leakage risks can be provided.

REFERENCE SIGNS LIST 1, 1C Information Concealing Apparatus
1A, 140C Concealment Information Generating Unit
1B Information Concealing Control Apparatus
2, 2C Information Reconfiguring Apparatus
2A, 250C Reconfiguring Unit
2B Information Reconfiguration Control Apparatus
3 User Information Input Terminal
4 Network
11 CPU
12 ROM
13 RAM
14 Storage Medium
15 Interface (I/F)
16 Bus
17 Input Unit
18 Display Unit
100 Controller
110, 110C Concealment-Side Pseudo-Random Number Generating Unit
120, 120C Concealment-Side Converting Processing Unit
130, 130C Concealment Information Generating Control Unit
200 Controller
210, 210C Extracting Unit
220, 220C Reconfiguration-Side Pseudo-Random Number Generating Unit
230, 230C Reconfiguration-Side Converting Processing Unit
240, 240C Reconfiguration Control Unit
1000, 1000B, 1000C Information Concealing System

What is claimed is:

1. An information concealing control apparatus comprising:
   a memory storing instructions; and
   one or more processors configured to execute the instructions to:
      receive biometric information from a terminal;
      generate a pseudo-random number from a seed;
      perform converting processing of converting the biometric information into conversion information by using the pseudo-random number; and
      generate, when a Hamming weight of the conversion information is equal to or greater than a predetermined value, concealment information, based on the conversion information, the concealment information is used for reconfiguring the biometric information, the predetermined value indicates error correction capability of a private key embedded in the conversion information.

2. The information concealing control apparatus according to claim 1, wherein
   the seed includes identification information managed by a user who has input the biometric information.

3. The information concealing control apparatus according to claim 1, wherein
   the seed includes a disposable temporary value.

4. The information concealing control apparatus according to claim 1, wherein
   the converting processing includes reversible computing of input information and the pseudo-random number.

5. An information concealing control method performed by a computer and comprising:
   receiving biometric information from a terminal;
   generating a pseudo-random number from a seed;
   performing converting processing of converting the biometric information into conversion information by using the pseudo-random number; and
   generating, when a Hamming weight of the conversion information is equal to or greater than a predetermined value, concealment information based on the conversion information, the concealment information is used for reconfiguring the biometric information, the predetermined value indicates error correction capability of a private key embedded in the conversion information.

* * * * *